United States Patent
Stebbings

(10) Patent No.: US 6,636,689 B1
(45) Date of Patent: Oct. 21, 2003

(54) DATA DISC MODULATION FOR MINIMIZING PIRATING AND/OR UNAUTHORIZED COPYING AND/OR UNAUTHORIZED ACCESS OF/TO DATA ON/FROM DATA MEDIA INCLUDING COMPACT DISCS AND DIGITAL VERSATILE DISCS

(75) Inventor: David W. Stebbings, Washington, DC (US)

(73) Assignee: Recording Industry Association of America, Washington, DC (US)

( * ) Notice: Subject to any disclaimer, the term of this patent is extended or adjusted under 35 U.S.C. 154(b) by 0 days.

(21) Appl. No.: 09/315,104

(22) Filed: May 20, 1999

Related U.S. Application Data

(60) Provisional application No. 60/086,132, filed on May 20, 1998.

(51) Int. Cl.$^7$ .............................. H04N 5/91; H04N 5/85
(52) U.S. Cl. ......................................... 386/94; 386/125
(58) Field of Search ................................ 386/94, 52, 4, 386/1, 46, 95, 125, 126, 45; 360/15, 13, 60; 380/277, 282, 285; 705/57; H04N 5/91, 5/85

(56) References Cited

U.S. PATENT DOCUMENTS 4,363,965 A    12/1982  Soberman et al. .......... 250/302

(List continued on next page.)

FOREIGN PATENT DOCUMENTS

JP              9-171619          6/1997

OTHER PUBLICATIONS

International Examination Report PCT/US99/11184.

Primary Examiner—Robert Chevalier
(74) Attorney, Agent, or Firm—Irah H. Donner; Hale and Dorr LLP

(57) ABSTRACT

The present invention relates to a method and system for authenticating a media and/or the data stored on the media in order to prevent piracy and/or unauthorized access and/or unauthorized copying of the data stored on the media, including CDs and DVDs. According to the present invention, there are three ways that authentication keys can be formed and remain hidden without being transferred in the audio/video. These three methods are employed using conventional hardware and/or software in CD or DVD players, which may optionally be modified. Each method of producing authentication keys according to the present invention is a function of the physical characteristics of a disc that does not normally travel with the audio or video or graphics data. Authentication systems of the present invention optionally encompass singular, multiple or multi-level authentication systems, each of which successively must be deciphered before the audio/video is finally available, or, alternatively where each key component must be found in order to build the whole key to perform the entire decryption or authentication process.

44 Claims, 26 Drawing Sheets

U.S. PATENT DOCUMENTS

| | | | |
|---|---|---|---|
| 4,788,685 A | 11/1988 | Sako et al. | 371/38 |
| 4,811,325 A | 3/1989 | Sharples, Jr. | 369/85 |
| 4,862,143 A | 8/1989 | Hirshfield et al. | 340/572 |
| 4,879,704 A | 11/1989 | Takagi et al. | 369/14 |
| 4,937,679 A | 6/1990 | Ryan | 358/335 |
| 4,975,898 A | 12/1990 | Yoshida | 369/100 |
| 5,319,735 A | 6/1994 | Preuss et al. | 395/2.14 |
| 5,400,319 A | 3/1995 | Fite et al. | 369/275.5 |
| 5,412,718 A | 5/1995 | Narasimhalu et al. | 380/4 |
| 5,418,852 A | 5/1995 | Itami et al. | 380/4 |
| 5,473,584 A | 12/1995 | Oshima | 369/32 |
| 5,513,260 A | 4/1996 | Ryan | 380/3 |
| 5,538,773 A | 7/1996 | Kondo | 428/64.1 |
| 5,570,339 A | 10/1996 | Nagano | 369/275.3 |
| 5,572,507 A | 11/1996 | Ozaki et al. | 369/275.4 |
| 5,572,589 A | 11/1996 | Waters et al. | |
| 5,596,639 A | 1/1997 | Kikinis | 380/4 |
| 5,608,717 A | 3/1997 | Ito et al. | 369/275.3 |
| 5,608,718 A | 3/1997 | Schiewe | 369/275.4 |
| 5,636,276 A | 6/1997 | Brugger | 380/4 |
| 5,636,281 A | 6/1997 | Antonini | 380/25 |
| 5,699,343 A | 12/1997 | Moritsugu et al. | 369/124 |
| 5,761,301 A | 6/1998 | Oshima et al. | 380/4 |
| 5,917,910 A | 6/1999 | Ishiguro et al. | 380/4 |
| 5,930,209 A | 7/1999 | Spitzenberger et al. | 369/32 |
| 5,930,367 A | 7/1999 | Osawa et al. | 380/49 |
| 6,233,684 B1 | 5/2001 | Stefik et al. | |
| 6,411,772 B1 * | 6/2002 | Cookson et al. | |
| 6,438,692 B2 * | 8/2002 | Kato et al. | |

\* cited by examiner

DISC
PLAYING TIME:                           74 MINUTES, 33 SECONDS MAXIMUM
ROTATION:                               COUNTER-CLOCKWISE WHEN VIEWED
                                        FROM READOUT SURFACE
ROTATIONAL SPEED:                       1.2-1.4 m/sec.
TRACK PITCH:                            1.6 μm
DIAMETER:                               120 mm
THICKNESS:                              1.2 mm
CENTER HOLE DIAMETER:                   15 mm
RECORDING AREA:                         46 mm-117 mm
SIGNAL AREA:                            50mm-116 mm
MATERIAL:                               ANY TRANSPARENT MATERIAL WITH
                                        1.55 REFRACTION INDEX, SUCH AS
                                        POLYCARBONATE
MINIMUM PIT LENGTH:                     0.833 μm (1.2 m/sec.) to 0.972 mm (1.4 m/sec.)
MAXIMUM PIT LENGTH:                     3.05 μm (1.2 m/sec.) to 3.56 mm (1.4 m/sec.)
PIT DEPTH:                              APPROX. 0.11 μm
PIT WIDTH:                              APPROX. 0.5 μm OPTICAL SYSTEM
STANDARD WAVELENGTH:                    $\lambda$ = 780 nm (7.800A)
FOCAL DEPTH:                            ± 2 μm
($\lambda$/NA ≤ 1.75 μm, NA: NUMERICAL APERATURE)

SIGNAL FORMAT
NUMBER OF CHANNELS:                     2 CHANNELS (4-CHANNEL RECORDING
                                        POSSIBLE)
QUANTIZATION:                           16-BIT LINEAR QUANTIZATION
QUANTIZING TIMING:                      CONCURRENT FOR ALL CHANNELS
SAMPLING FREQUENCY:                     44.1 kHz
CHANNEL BIT RATE:                       4.3218 Mb/sec.
DATA BIT RATE:                          2.0338 Mb/sec.
DATA-TO-CHANNEL BIT RATIO:              8:17
ERROR CORRECTION CODE:                  CIRC (WITH 25% REDUNDANCY)
MODULATION SYSTEM:                      EFM

FIG. 1
PRIOR ART

-- NORMAL VOLTAGE
— ACTUAL VOLTAGE
--- +/- TOLERANCE

— ACTUAL
-- TOLERANCE

DATA DISC MODULATION FOR MINIMIZING PIRATING AND/OR UNAUTHORIZED COPYING AND/OR UNAUTHORIZED ACCESS OF/TO DATA ON/FROM DATA MEDIA INCLUDING COMPACT DISCS AND DIGITAL VERSATILE DISCS

RELATED APPLICATION

This application claims priority from U.S. provisional Application No. 60/086,132, filed on May 20, 1998, which is incorporated herein by reference.

FIELD OF INVENTION

This invention relates generally to anti-data pirating technology. More specifically, the invention relates to data disc modulation for preventing piracy and/or unauthorized access and/or unauthorized copying of data, such as audio and/or video data from a data source, such as compact discs (CDs), digital versatile discs, (DVDs), hard drive discs, an Internet Service Provider (ISP) data source, and other data discs and/or data sources via direct connection, or via a local and/or global network, such as the Internet.

BACKGROUND OF THE INVENTION

There are two basic methods for recording sound and music—analog and digital. See e.g. Ken C. Pohlmann, "The Compact Disc", THE COMPUTER MUSIC & DIGITAL AUDIO SERIES, Volume 5. The above-mentioned audio series, which was published by A-R Editions, Inc., in Madison, Wis., is, along with all volumes therein, incorporated by reference.

In analog recording, the recording medium (a tape) varies continuously according to the sound signal. In other words, an analog tape stores sound signals as a continuous stream of magnetism. The magnetism, which may have any value within a limited range, varies by the same amount as the sound signal voltage.

In digital recording, the sound signal is sampled electronically and recorded as a rapid sequence of separately coded measurements. In other words, a digital recording comprises rapid measurements of a sound signal in the form of on-off binary codes represented by ones and zeros. In this digital system, zeros are represented by indentations or pits in a disc surface, and ones are represented by unpitted surfaces or land reflections of the disc, such that a compact disc contains a spiral track of binary codes in the form of sequences of minute pits produced by a laser beam.

Music that is input to a digital recording and the requisite series of reproduction processes, must pass through the recording side of a pulse code modulation (PCM) system. A master recording of the music is stored in digital form on a magnetic tape or optical disc. Once the magnetic tape has been recorded, mixed and edited, it is ready for reproduction as a CD. The CD manufacturer then converts the master tape to a master disc, which is replicated to produce a desired number of CDs. At the end of the PCM system is the reproduction side, the CD player, which outputs the pre-recorded music.

If digital technology is used in all intermediate steps between the recording and reproduction sides of the PCM system, music remains in binary code throughout the entire chain; music is converted to binary code when it enters the recording studio, and stays in binary code until it is converted back to analog form when it leaves the CD player and is audible to the listener. In most CD players, digital outputs therefrom preserve data in its original form until the data reaches the power amplifier, and the identical audio information recorded in the studio is thereby preserved on the disc.

Optical Storage

The physical specifications for a compact disc system are shown in Prior Art FIG. 1. They were developed jointly by Sony and Philips, and are defined in the standards document entitled Red Book, which is incorporated herein by reference. The CD standard is also contained in the International Electrotechnical Commission standard entitled, Compact Disc Digital Audio System, also incorporated herein by reference. Disc manufacturers, as well as CD player manufacturers, must obtain a CD license to use these specifications.

All disc dimensions, including those pertaining to pit and physical formations, which encode data, are defined in the CD standard. For example, specifications information on sampling frequency, quantization word length, data rate, error correction code, and modulation scheme are all defined in the standard. Properties of the optical system that reads data from the disc using a leaser beam are also defined in the standard. Moreover, basis specifications relevant to CD player design is located in the signal format specifications.

Referring to Prior Art FIG. 2, the physical characteristics of the compact disc surface structure are described. Each CD is less than 5 inches in diameter whose track thickness is essentially thinner than a hair and whose track length averages approximately 3 and a half miles. The innermost portion of the disc is a hole, with a diameter of 15 mm, that does not hold data. The hole provides a clamping area for the CD player to hold the CD firmly to the spindle motor shaft.

Data is recorded on a surface area of the disc that is 35.5 mm wide. A lead-in area rings the innermost data area, and a lead-out area rings the outermost area. Both lead-in and lead-out areas contain non-audio data used to control the CD player. Generally, a change in appearance in the reflective data surface of a disc marks the end of musical information.

A transparent plastic substrate comprises most of the CD's 1.2 mm thickness. Viewing a magnified portion of the CD surface, as shown in Prior Art FIG. 2, the top surface of the CD is covered with a very thin metal layer of generally aluminum, silver or gold. Data is physically contained in pits impressed along the CD's top surface. Above this metalized pit surface and disc substrate lies another thin protective lacquer coating (10 to 30 micrometers). An identifying label (5 micrometers) is printed on top of the lacquer coating.

A system of mirrors and lenses sends a beam of laser light to read the data. A laser beam is applied to the underside of a CD and passes through the transparent substrate and back again. The beam is focused on the metalized data surface that is sandwiched or embedded inside the disc. As the disc rotates, the laser beam moves across the disc from the center to the edge. This beam produces on-off code signals that are converted into, for example, a stereo electric signal.

The Pit Track

Prior Art FIG. 3 shows a typical compact disc pit surface. Each CD contains a track of pits arranged in a continuous spiral that runs from the inner circumference to the outer edge. The starting point begins at the inner circumference because, in some manufacturing processes, tracks at the outer diameter of a CD are more generally prone to manufacturing defects. Therefore, CDs with shorter playing time provide a greater manufacturing yield, which has led to adoption of smaller diameter discs (such as 8 cm CD-3 discs) or larger diameter discs (such as 20 and 30 cm CD-Video discs).

Prior Art FIG. 4 shows a diagram of a typical track pitch. The distance between successive tracks is 1.6 micrometers. That adds up to approximately 600 tracks per millimeter. There are 22,188 revolutions across a disc's entire signal surface of 35.5 millimeters. Hence, a pit track may contain 3 billion pits. Because CDs are constructed in a diffraction-limited manner—creating the smallest formations of the wave nature of light—track pitch acts as a diffraction grating; namely, by producing a rainbow of colors. In fact, CD pits are among the smallest of all manufactured formations.

The linear dimensions of each track on a CD is the same, from the beginning of a spiral to the end. Consequently, each CD must rotate with constant linear velocity, a condition whereby uniform relative velocity is maintained between the CD and the pickup.

To accomplish this, the rotational speed of a CD varies depending on the position of the pickup. The disc rotates at a playing speed which varies from 500 revolutions per minute at the center, where the track starts, to 200 revolutions per minute at the edge. This difference in speed is accounted for by the number of tracks at each position.

For example, because each outer track revolution contains more pits than each inner track revolution, the CD must be slowed down as it plays in order to maintain a constant rate of data. So, when the pickup is reading the inner circumference of the CD, the disc rotates at the higher speed of 500 rpm. And as the pickup moves outwardly towards the disc's edge, the rotational speed gradually decreases to 200 rpm. Thus, a constant linear velocity is maintained, such that all of the pits are read at the same speed. The CD player constantly reads from synchronization words from the data and adjusts the disc speed to keep the data rate constant.

A CD's constant linear velocity (CLV) system is significantly different from an LP's system. A major difference stems from the fact that a turntable's motor rotates at a constant velocity rate of 33⅓ grooves. This translates into outer grooves having a greater apparent velocity than inner grooves, probably explained by the occurrence that high-frequency responses of inner grooves is inferior to that of outer grooves. If a CD used constant angular velocity (CAV) as opposed to the CLV system, pits on the outside diameter would have to be longer than pits on the inner diameter of the disc. This latter scenario would result in decreased data density and decreased playing time of a CD.

Like constant linear velocity, light beam modulation is also important to the optical read-out system that decodes the tracks. See Prior Art FIG. 5. A brief theoretical discussion on the distinctions between pit and land light travel explains this point.

Generally, when light passes from one medium to another with a different index of refraction, the light bends and its wavelength changes. The velocity at which light passes is important, because when velocity is slow, the beam bends and focusing occurs. Owing to several factors, such as the refractive index, disc thickness and laser lens aperture, the laser beam's size on the disc surface is approximately 800 $\mu$m. However, the laser beam is focused to approximately 1.7 $\mu$m at the pit surface. In other words, the laser beam is focused to a point that is a little larger than a pit width. This condition minimizes the effects of dust or scratches on the CD's outer surface, because the size of dust particles or scratches are effectively reduced along with the laser beam. Any obstruction less than 0.5 ml are essentially insignificant and causes no error in the readout.

As previously noted, a CD's entire pit surface is metalized. In addition, the reflective flat surface between each pit,(i.e. a land), causes almost 90 percent of laser light to be reflected back into the pickup. Looking at a spiral track from a laser's perspective on the underside of a disc, as shown in Prior Art FIG. 5, pits appears as bumps. The height of each bump is generally between 0.11 and 0.13 $\mu$m, such that this dimension is smaller than the laser beam's wavelength (780 nanometers) in air. The dimension of the laser beam's wavelength in air is larger than the laser's wavelength (500 nanometers) inside the disc substrate, with a refractive index of 1.55. In short, the height of each bump is, therefore, one-quarter of the laser's wavelength in the substrate.

Scientifically, this means that light striking a land will travel twice as far than light striking a bump. This discrepancy in light travel distances serve to modulate the intensity of a light beam. This allows data physically encoded on the disc to be recoverable by the laser.

Also, the pits and intervening reflective lands on the disc's surface do not directly designate ones and zeros. Rather, it is each pit's edge, whether leading or trailing, that is a 1 and all areas in between, whether inside or outside a pit, that are designated as zeros. Still, each pit and reflective land lengths vary incrementally. The combinations of 9 different pit and land lengths of varying dimensions physically encode the data.

Error Correction

Error correction is one of the major advantages of digital audio storage media, such as compact discs, over analog media, like LPS. Error correction simply corrects the error.

When an LP is scratched, for instance, the grooves are irrevocably damaged, along with the information contained in them. On every replay of that record, there will be a click or pop when the damaged part of the groove passes beneath the needle.

This is not the case for CDs. The data on every disc is specially encoded with an error correction code. When a scratched CD is played, the CD player uses the error correction code to perform error correction every time the disc is played. Thus, it delivers the original undamaged data, instead of the damaged data.

CD Player Overview

The CD player contains two primary systems: an audio data processing system and a control system. Prior Art FIG. 6 depicts a block diagram of a CD player showing an audio path as well as servo and control functions. Generally, the data path, which directs modulated light from the pickup through a series of processing circuits, consists of several elements that ultimately produces a stereo analog signal. These elements of the data path include a data separator, buffer, de-interleaving RAM, error correction circuit, concealment circuit, oversampling filter, digital-to-analog (D/A) converters, and output filters.

The servo and control system, in addition to a display system, directs the mechanical operation of the CD player, such as the player's spindle drive, and auto-tracking and auto-focusing functions. The servo, control and display system also directs the user interface to the CD player's controls and displays.

A CD player uses a sophisticated optical read-out system to read data, control motor speed, track the pit spiral and adjust pickup positions and timings. While a spindle motor is used to rotate the disc with constant linear velocity, in another servo loop, information from the data itself determines correct rotating speed and data output rate.

User controls and their interface to the player's circuitry is monitored by a microprocessor. A software program controls several modes of player operation. Subcode data is also used to direct the pickup to the proper disc location. For example, a time code is used to locate the start of any track.

Once data is recovered from the CD, the player must go through a series of activities to decode audio information in order to reconstruct an audio signal; namely, the EFM (eight-to-fourteen modulation) data is modulated, and errors are detected and corrected using an error correction algorithm. Additionally, using interpolation and muting, the audibility of gross errors is minimized.

Subsequent to decoding of the audio information, the digital data must be converted to a stereo analog signal. This conversion process requires one or two D/A converters and low-pass filters (in analog or digital domain).

An audio de-emphasis circuit exists in the audio output stages of CD every player. Some CDs are configured for improved signal-to-noise ratio. This configuration is accomplished by encoding the CD with an audio pre-emphasis flag in the subcode, where high frequencies on a master tape is slightly boosted (50/15 $\mu$s characteristic). The result, on CD playback, is inverse attenuation of the disc's high frequencies, because the player switches in the de-emphasis circuit when required, so that the signal-to-noise ratio is slightly improved.

The final output circuit is the buffer, which ensures that the CD player's line level output is appropriate to drive necessary external amplifiers with a minimum amount of analog distortion.

Pickup Design

With-respect to a player's pickup design, a CD may contain as many as three billion pits, all orderly arranged on a spiral track. Each optical read-out system, which comprises an entire lens assembly and pickup, must focus, track and read data stored on a spiral track. The lens assembly, which is a combination of the laser beam and a reader, must be small enough to move across the underside of a disc in response to tracking information and user random-access programming. Moreover, movement of the pickup from a CD's center to its edge must be focused despite adverse playing conditions, such as when a CD is dirty or vibrating.

Auto-Tracking

Unlike an LP, which has grooves to guide the pickup, a CD has a singular spiral pit track running from a center circle to its outer edge. The only object that touches the disc surface is an intensity-modulated laser light, which carries data and which is susceptible to obstructions, such as vibrations. Four standard methods have been designed for tracking pit spiral: (1) one-beam push-pull; (2) one-beam differential phase detection; (3) one-beam high frequency wobble; and (4) three-beam.

Auto-Focusing

The optical pickup must be precise in order to accommodate approximately 600,000 pits per second. Even the flattest disc is not perfectly flat; disc specifications acknowledge this by allowing for a vertical deflection of ±600 $\mu$m. In addition, a ±2 $\mu$m tolerance is required for the laser beam to stay focused, otherwise the phase interference between directed and reflected light is lost, along with audio data, tracking and focusing information. Therefore, the objective lens must be able to re-focus while the disc's surface deviates vertically.

An auto-focus system, driven by a servo motor, manages this deviation, using control electronics and a servo motor to drive the objective lens. Three techniques are available for generating a focusing signal: (1) a cylindrical lens using astigmatism; (2) a knife edge using Foucault focusing; and (3) critical angle focusing.

Any pickup must perform both tracking and focusing functions simultaneously. Therefore, a completed pickup design would use a combination of the above-mentioned auto-tracking and auto-focusing techniques. Two standard pickup designs stand out from the rest when auto-tracking and auto-focusing functions are combined: (1) one-beam push-pull tracking with Foucault focusing, (hereinafter "one-beam pickup"); and (2) three-beam tracking with astigmatic focusing, (hereinafter "three-beam pickup").

Both of these designs have been commercialized among manufacturers. One-beam pickups, which are usually mounted on a distal end of a pivoting arm, swings the pickup across a disc in an arc. On the other hand, three-beam pickups are mounted on a sled, which slides linearly across the disc.

The following exemplary prior art discussion will be limited to three-beam pickups only.

Three-Beam Pickup Optical Design

Prior Art FIG. 7 shows the optical path of a three-beam pickup, which uses a laser as the light source. A laser is used, rather than a bulb, for a number of reasons. First, a laser uses an optical resonator to stimulate atoms to a higher energy level that induces them to radiate in phase, a condition necessary to achieving sharper data surface focus and proper intensity modulation from the pit height.

Second, a laser light, unlike a bulb's light, which radiates all the frequencies of a spectrum at all different phases, is composed of a single frequency and is coherent in phase. An important advantage of phase coherency is phase cancellation in the beam that is produced by disc pits, so that disc data can be read. Most CD pickups use an aluminum gallium arsenide semiconductor laser with a 0.5 milliwatt optical output that radiates a coherent-phase laser beam with a 780 nanometer wavelength; the beam is comprised of near-infrared light.

Referring to Prior Art FIG. 7, a laser diode is positioned adjacent the focal point of a collimator lens with a long focal distance, for the purpose of making the divergent light rays parallel. A monitor diode (not shown) is also placed adjacent the laser diode in order to control power to the laser. The monitor diode stabilizes the laser's output in two important ways; first, by compensating for temperature changes so as to prevent thermal runaway; and second, by conducting current in proportion to the light output of the laser.

The three-beam pickup is so termed because it uses three beams for tracking and reading a CD. To generate these beams, a laser light first passes through a diffraction grating, which resembles a screen with evenly-spaced slits of a few laser wavelengths apart. As the beam passes through the grating, the light diffracts into fringes of parallel light beams. When the collection of these beams is re-focused, the collection appears as a single, bright centered beam with a series of successively less intense beams on either side of the center beam.

It is this diffraction pattern that actually strikes the CD, where the center beam is used for both reading data and focusing. In a three-beam pickup, two of the series of successively less intense beams, or two secondary beams, are used for tracking only. In a one-beam pickup, data reading, focusing and tracking is accomplished with just one beam.

Another element in the three-beam optical design is the polarization beam splitter, or PBS, which consists of two prisms having a common 45 degree facing that acts as a polarizing prism. The purpose of the PBS is to direct the laser light to the disc, and to angle the reflected light (from the disc) to the photosensor. In some designs, a half-silvered mirror is used.

In Prior Art FIG. 7, the collimator lens is shown as following the PBS, even though it can precede the PBS in other designs. Once the light exits the collimator lens, it then passes through a quarter-wave plate (QWP). The QWP is an anisotropic material that exhibits properties with different values when measured in different directions, so that when light passes through the QWP, it rotates the plane of polarization of each passing light beam. This rotation is required to make the PBS work.

The anisotropic quality of the quarter-wave plate is equally important to the process occurring on the right-hand side of the plate. Light passing through the QWP to the CD, will be reflected from the CD back again through the QWP and become polarized. More importantly, the light is polarized in a plane at right angles to that of the incident light.

In other words, the reflected polarized light re-entering the quarter-wave plate (from right to left) will pass through the collimator and strike the polarization beam splitter. Because the polarization beam splitter passes light in one plane only (e.g., horizontally) but reflects light in the other plane (e.g., vertically), the PBS will properly deflect the reflected beam toward the photodiode sensor to read the digital data.

The final optics element in the path to the CD is the objective lens. The objective lens is used to focus laser beams into a convergent cone of light onto the CD's data surface, taking into account the refractive index of the polycarbonate substrate of the disc. Convergence is a function of the numerical aperture (NA) of the lens, with most pickups using an objective lens having an NA of about 0.5.

As mentioned earlier, the laser beam's size on the outer surface of the CD's transparent polycarbonate substrate is approximately 800 micrometers in diameter. Since the refractive index of the substrate is 1.55 and its thickness is 1.2 millimeters, the laser beam's size is narrowed to 1.7 micrometers at the reflective surface, a size slightly wider than the pit width of 0.5 micrometer and comparable in width to the light's wavelength.

When the laser beam strikes a land, (the smooth surface between two pits), light is almost totally reflected. When the light strikes a pit (viewed as a bump by the laser), diffraction and destructive interference cause less light to be reflected.

In short, all three intensity-modulated light beams pass through the objective lens, the QWP, collimator lens, and the PBS. Before hitting the photodiode, they pass through a singlet lens and a cylindrical lens.

In any optical pickup system, automatic focusing is an absolute prerequisite. Disc warpage and other irregularities causes vertical deflections in the CD's data surface. Such movement would place the data out of the pickup's depth of focus, essentially making it impossible for the pickup to distinguish between pit height and land phase differences.

The unique properties of astigmatism are used to achieve auto-focusing in a three-beam CD player. This is illustrated in Prior Art FIG. 8.

The cylindrical lens, (see Prior Art FIG. 7), which prefaces the photodiode array, detects an out-of-focus condition. The condition is directly related to the distance between the objective lens and the CD's reflective surface. As this distance varies, the focal point changes, and the image projected by the cylindrical lens changes its shape. The inter-relationship of the above elements is illustrated in Prior Art FIG. 8.

Changes in an image on the photodiode generates a focus correction signal. For example, when the distance between the objective lens and the CD decreases, the image projected by the lens moves further from the cylindrical lens, and the pattern becomes elliptical. Conversely, when the distance between the objective lens and the CD increases, the image projected by all lenses (e.g., the objective lens, an intermediate convex lens and the cylindrical lens) moves closer to the lens. However, the elliptical pattern that is formed is now rotated 90 degrees from the first elliptical pattern.

In the third and final scenario, which is when the disc surface lies exactly at the focal point of the objective lens, the image reflected through the intermediate convex lens and cylindrical lens is unchanged, and a circular spot strikes the center of the photodiode.

An important aspect of the three-beam auto-focus system is correction voltages. A photodiode uses a laser beam's intensity level to generate a focus correction voltage, which in turn generates a control signal. These electrical signals control the mechanical motion of a servo motor, which is responsible for moving the objective lens along an optical axis in response to any vertical disc motion. Servo-controlled movement of the objective lens during disc motion results in automatic focusing.

Prior Art FIG. 9 illustrates a typical servo motor used to move the objective lens in the optical path. The servo motor consists of a coil and magnet structure generally used in loudspeakers.

Operation of a CD player begins when a CD is first loaded into the player. Technically, an electrical control signal is sent into the optical pickup system, which causes the laser to turn on, and the objective lens to move vertically until a focus condition is reached.

Then, the auto-focusing system takes over, except if two negative situations occur. If no CD is detected, the automatic focusing system tries again, and cuts off if it fails to detect a CD again. If the auto-focus is inoperative, such as when the CD tray is open, the system pulls back the objective lens to prevent damage to the lens or CD. Otherwise, the automatic focusing system performs its operation smoothly by keeping the pickup properly positioned beneath the spinning disc, in effect maintaining focus to within a tolerance of approximately ±0.5 micrometers.

Content Scrambling System

Currently, encryption for data media, such as DVDs, involves one key. It is a fairly simple 40-bit scheme. There is good authentication of the platform, which is performed by various key exchanges within the mechanisms between the source drive and the actual platform decrypting the data.

A content scrambling system (CSS) is included in every DVD player. CSS is a method of encrypting a disc that the information technology (IT) and.motion picture industries agreed upon. In order to be licensed to manufacture DVD players, a company is required to obey certain rules pertaining to the uses (and non-uses) that a platform can perform, as part of a license agreement.

While the present invention is not required to incorporate the CSS encryption system, it could be one level of encryption, if a multi-level encryption is employed. Audio information is generally encrypted prior to being burned into a disc, such as a CD. Hence, there is no plain text; encrypted information only is contained on a CD. So, if a user seeks to access information contained on the CD, whether for listening or copying purposes, the user would have to decrypt the data in order to hear sensible audio data.

In general, existing ideas in the field appear to bury authentication keys within encrypted information that is burned into the disc. Authentication keys are buried using various authentication processes, which verify that the platform device—whether a computer, CD player, DVD player, or the like—is a licensed device and, consequently, obeys certain copyright rules. Eventually, the licensed device uncovers the buried authentication key(s) and decrypts the data contained on the disc. So, the system needs to find the key before being eligible for decrypting the audio data.

The following prior patents represent the state of the art of preventing unauthorized copying of data, and are all hereby incorporated by reference:

U.S. Pat. No. 4,811,325 to Sharples, Jr. et al. discloses high speed copying of audio programs on optical CDs. The master CD is encoded using Adaptive Delta Modulation (ADM).

U.S. Pat. No. 4,879,704 to Takaai et al. prevents copying of an optical dis. Data is stored in a record protected area and in a record unprotected area, where each such sector has a representative address that helps to determine whether the data is in the record protected area or in the record unprotected area. Only data from the record unprotected area with an appropriate address can be copied.

U.S. Pat. No. 4,937,679 to Ryan discloses a video recording and copy prevention system. The video signal includes a copy-protect signal. Designated detectors detect the presence of copy-protected signal(s) and inhibit copying of such signals. A video correlate enables one to playback a copy-protected program for viewing only and generates an inhibit signal to prevent copying of a copy-protected signal.

In U.S. Pat. No. 4,975,898 to Yoshida, an erasing program erases the non-rewritable portion so that it cannot be copied on a copy disc during unauthorized copying of an optical disc.

U.S. Pat. No. 5,319,735 to Preuss et al. uses a digital code signal embedded with the original audio signal. The digital code gets transferred to the copy disc.

In U.S. Pat. No. 5,412,718 to Narasimhalu et al., non-uniformities and their attributes in the storage medium is used as a unique signature. This signature is used to derive a key for encrypting the information on the storage medium. During copying, the signature gets mutated and the information cannot be decrypted. During authorized copying, the information is decrypted by generating a key from the signature of the distribution medium.

In U.S. Pat. No. 5,418,852 to Itami et al., data is stored in a user accessible area and in a user inaccessible area, which are both compared to determine the authenticity of the recording medium.

In U.S. Pat. No. 5,513,260 to Ryan, copy-protected CDs have authenticating signature recorded on them. An authentication signature is obtained by a deliberately induced radial position modulation giving an error voltage corresponding to the elliptical errors. When playing the CD, the signature causes the player to correctly decrypt the program whereas, when playing an unauthorized copy of the CD, the absence of the signature is detected and false data is generated and the player does not play.

U.S. Pat. No. 5,538,773 to Kondo discloses the recording of data together with a cipher key information for copy protection.

U.S. Pat. No. 5,570,339 to Nagano discloses a system that converts data to digital data, which is then FM modulated with key information to vary the widths of the pits at the time of recording. During reproduction, the data is read out and if the key information is determined to be missing, copying is prevented.

U.S. Pat. No. 5,608,717 to Ito et al. discloses a CD-ROM that has a character/graphic pattern for copy protection. Password and information on the position of the character/graphic pattern bearing area of the CD-ROM are stored beforehand in a memory included in the CD-ROM's controller of the playback system. The CD-ROM controller, therefore, will have the means for deciphering the enciphered password. Data are modulated by the EFM modulation method into bits of predetermined width and height having values corresponding to the EFM.

U.S. Pat. No. 5,608,718 to Schiewe discloses an optical disc having shallow pits bearing an identification/logo/watermark. The lands and pits are of different lengths for identification/authorization purposes when copying a CD.

U.S. Pat. No. 5,636,276 to Brugger discloses the distribution of digital music with copyright protection. An encryption table is embedded in the music CD player and includes a decryption module that uses the encryption table for authorized playing of music/information.

U.S. Pat. No. 5,636,281 to Antonini discloses an authorized access that uses mingling of data elements of the program memory to be protected according to a secret order. To use this memory, a transcending device is used. The transcending device is in the form of a memory containing several tables, only one of which gives the right transcending data elements.

The problem with one or more of the above-mentioned conventional encryption/decryption systems is that a pirate or hacker seeking to hack into the encryption process on a disc could do so by playing the encrypted music, finding the decryption key, which is already buried, mixed and interleaved with the audio data or the encrypted audio data, and using that key to decrypt the audio on the disc.

In other words, accompaniment of the decryption key within the audio data lends itself to discovery, even if the audio data is played or transmitted in an encrypted form. A hacker could obtain decryption key(s) even if the encrypted audio data was placed onto an unlicensed computer platform having a DVD ROM drive that did not obey copyright protection rules. That is, if the audio is later played back, the key would be output along with the encrypted audio data.

An additional problem in one or more of the prior art references is that keys specific to, or derived from, the physical construction of the CD are not constructed or determined in a manner that is difficult to detect by a hacker. A further problem in the prior art is that the physical characteristics of the CD which are used to derive a key for authorized copying, are transferred in the audio and may be accessible to the hacker.

Yet another problem in one or more of the prior art references is that the solutions proposed therein require significant additional hardware and/or software to be implemented. That is, these prior art techniques do not take advantage of existing hardware/software within the CD or DVD player that can be used effectively to prevent unauthorized copying.

Yet another problem in one or more of the prior art references is that the solutions proposed therein are expensive, and incompatible with existing CD or DVD players. Hence, current solutions to unauthorized copying are difficult and impractical in their implementation.

Yet another problem in one or more of the prior art references is that the solutions proposed therein are limited to CD and/or DVD players, and do not consider or structure such techniques when data is transmitted from, to, and/or over local and/or global networks, such as the Internet.

SUMMARY OF THE INVENTION

It is a feature and advantage of the present invention to provide a method and/or apparatus for minimizing pirating of, or unauthorized access to, data on a data media that is inexpensive, and compatible with existing CD and/or DVD-players, and other forms of data recording and/or playing devices.

It is another feature and advantage of the present invention to provide a method and/or apparatus for minimizing pirating of, or unauthorized access to, data on a data media that is manageable and practical in its implementation.

It is another feature and advantage of the present invention to provide a method and/or apparatus for minimizing pirating of, or unauthorized access to, data on a data media that does not require significant additional hardware and/or software in its implementation.

It is another feature and advantage of the present invention to provide.a method and/or apparatus for minimizing pirating of, or unauthorized access to, data on a data media that uses and/or adapts existing hardware/software within, for example, the CD or DVD player that can be used effectively to prevent unauthorized copying.

It is another feature and advantage of the present invention to provide a method and/or apparatus for minimizing pirating of, or unauthorized access to, data on a data media that uses or creates data keys specific to, or derived from, the physical construction of the CD or other data disc in a manner that is difficult to detect by a hacker.

It is another feature and advantage of the present invention to provide a method and/or apparatus for minimizing pirating of, or unauthorized access to, data on a data media that uses the physical characteristics of the CD to derive a key for authorized copying, and which key is prevented from being transferred in the audio and, therefore, not accessible to the hacker.

The present invention relates to a method and system of preventing unauthorized copying of data on data media, including CDs and DVDs. Generally, an authorized CD is designed to require decoding by an authorized disc player. The authorized CD includes certain information used by an authorized CD player for playing music. An unauthorized copied CD, however, does not have the requisite encryption/decryption key(s) necessary for decoding.

Consequently, a feature and advantage of the present invention is to prevent piracy of audio and/or video data from data discs; that is, to provide greatly enhanced security measures against data disc pirating. The present invention is based, in part, on my discovery that the authorization key(s) need not necessarily be transferred in the audio using conventional hardware and/or software in, for example, CD or DVD players that may be adapted in one or more ways described below.

The above features and advantages are accomplished generally by making a physical mark on the media; a mark that would represent zeros and ones forming part of an authentication key or keys. Physical marking of the data media is manifested in three different methods; namely, via pit width modulation, pit depth modulation and/or pit track modulation.

Singular or multi-level decryption systems may be used for preventing unauthorized copying of audio data on a disc. Similarly, two or three different decryption systems, each of which successively must be decrypted before the audio is finally available, may also be used.

Advantageously, the present invention optionally uses three or four different sources for making or compiling a long or compound keys. Thus, in other words, instead of having a multi-layered decryption or authentication system, the present invention optionally includes a multi-level key, each component of which must be found in order to build the whole key to perform the entire authentication process.

According to the present invention, there are three ways that these authentication keys can be formed and remain hidden. Each method of producing authentication keys are a function of the physical characteristics of a disc that does not normally travel with the audio data. Each method generally makes a physical mark on the media representing zeros and ones, which form part of an authentication key. Moreover, the following three methods may be used individually and/or in combination to prevent piracy of audio and/or video data from discs, such as CDs, DVDs, and other data, discs.

The first method is pit width modulation, which requires, in the normal layers of a CD or DVD, a variation in the width of a pit. Variations preferably occur within normal manufacturing tolerances of 10 to 15 percent. A CD or DVD player would require an additional detector that would examine voltage irregularities resulting from width modulation.

Another method is pit depth modulation, by which variations in pit depth also preferably occur in a predetermined physical manner within normal manufacturing tolerances. According to this method, a disc player would not register a disc's abnormal tolerances. The focus server, which focuses the layers contained on a disk, would supply a modulated voltage according to a pit depth modulation. The modulated voltage could then be used to obtain a key. For example, different predetermined modulated voltages may be indicative of different keys.

A third method is pit track modulation in which the smooth, continuous spiral is modulated on a very small level with data at low frequencies relative to the pit rate. It is also possible to modulate the spiral by looking at the modulation of the tracking server in a player. The data is then built with a part of the key. Here, modulation also occurs within normal manufacturing tolerances (e.g., ±10–15 percent) to avoid running the risk that existing players would not be able to track the disc successfully.

The advantage of using one or more of the above three physical methods of burying authentication key(s) on a disc is that it eliminates an obvious method that a pirate could use to reproduce discs. That is, a pirate will have to initially produce a disc that meets the physical predetermined requirements of the disc to be copied, before being able to copy therefrom.

For example, it is possible to get at the direct data output from a CD or DVD player before any of the demodulation processes occurs. This is accomplished using the RF or FM method, where the data stream is copied directly from one disc to another disc by going to a direct data input. Thus, actual audio data stored on a disc can be easily transferred, bit for bit or symbol for symbol, and copied onto another disc, because the data being copied is a function of the actual audio encrypted data screen; it is not a function of the pit width or track modulation.

The present invention, on the other hand, employs methods of producing authentication keys that are a function of the physical characteristics of a disc that do not travel with the audio data. The present invention configures the physical characteristics of a disc by essentially creating a predetermined modulation used to bury one of the authentication keys, which would not be transferred and which will not appear at the audio output. Thus, another disc having the same modulation characteristics is required in order for it to be considered an authenticated CD or data disc.

Accordingly, the present invention utilizes a process that creates various depths or widths, for example, of pits in a disc within predetermined tolerances to generate an authentication key or keys in validating whether the disc (and/or data) is authentic and, therefore, proper to record thereon. Various standard processes may be used to impregnate, implant, form or configure the disc to include the predetermined pit depth, width or track modulation or variation with the desired tolerances.

Another feature of the present invention is the combinative use of the above three methods for either generating a security authentication key having two or more components, or for accessing the key buried in different places on the disc. For example, a single authentication key may comprise the combination of components generated by using the pit width, pit track and pit depth modulation methods.

Alternatively, one method, such as pit width modulation, may generate an authentication key that indicates a random location on the disc where a second authentication key or code is located, and so forth. That is, one method may be used as an address pointer, which may be programmed into the table-of-contents area on a disc.

Yet another alternative involves using one method, such as pit width modulation, to generate an authentication key or code that validates a second key/code, which can be generated using a different modulation method, such as pit track modulation. Additional keys and/or components may also be generated or used.

To achieve these and other objects, the present invention provides a computer program product that stores computer instructions thereon for instructing a computer to perform a process of authenticating a data media, such as a CD or DVD, as fraudulent/pirated or non-fraudulent.

In accordance with one embodiment of the invention, a method authenticates at least one of a media and data stored on the media in order to prevent at least one of piracy, unauthorized access and unauthorized copying of the data stored on the media. At least one pit depth, pit width or pit track modulated data, derived from a physical characteristic of a data disc, is introduced with the original data resulting in mixed data. The mixed data is optionally stored on the media. Each pit depth and/or pit width and/or pit track modulated data includes at least one authentication key or at least one component of an authentication key, for authenticating whether the media and/or data is authorized.

The method includes the following sequential, non-sequential and/or sequence independent steps: (a) reading mixed data from a media; (b) detecting at least one of pit depth, pit width and pit track modulated data from the mixed data; (c) comparing each pit modulated data to at least one authentication key or component thereof; (d) authenticating at least one of the media and the pit modulated data in the mixed data responsive to the comparing (c) step; (e) removing pit modulated data from the mixed data via a decoding operation resulting in substantially unimpaired corrected data; and (f) outputting the unimpaired corrected data as at least one of audio, video, audio data, video data and digital data substantially free of pit modulated data.

The method also includes the steps of: (g) physically altering at least one of a pit depth, pit width and pit track of a data disc on at least one of a per track basis and on an interval basis throughout the data disc such that authentication is performed for at least one of each track to be played, throughout playback and throughout recording; (h) using a process defined in at least one of the reading, detecting, comparing, authenticating, removing and outputting steps, as a multi-level authentication system containing at least two different authentication keys, each of which successively must be authenticated before said unimpaired corrected data is finally output; and (i) performing the method of authenticating over a plurality of interconnected computer networks comprising at least one of a local network, global network and Internet.

In accordance with another embodiment of the invention, a data player includes a data processor performing the steps of: (a) reading mixed data from the media; (b) detecting at least one of pit depth, pit width and pit track modulated data from the mixed data; and (c) comparing each pit modulated data to at least one authentication key or component thereof. The data player authenticates the media and/or the pit depth, pit width and/or pit track modulated data in the mixed data responsive to the comparing, and removes the pit modulated data from the mixed data resulting in substantially unimpaired corrected data. The data player outputs the data as at least one of audio, video, audio data, video data and digital data substantially free of pit modulated data.

According to another embodiment of the invention, a data message comprises at least one authentication key formed by modulating at least one of a disc pit, width and track on a basis of a physical characteristic of said disc. The pit modulated data is combined with the original data to form mixed data that is introduced into the data message. Each pit modulated data comprises at least one authentication key or component thereof used in authenticating whether the data message is authorized. The pit depth, pit width or pit track modulated data cannot be readily altered, obscured or removed from the mixed data without simultaneously degrading or impairing a quality of an audible component of the data message. The data message is advantageously transmitted substantially free of each pit modulated data, preventing a destination processor from reading and subsequently authenticating the data message.

According to another embodiment of the invention, a data disc comprises at least one variation, based on a physical characteristic of the disc, in the disc's pit width, pit depth and/or pit track. The pit depth, width and/or track modulated data is introduced with original data resulting into mixed data. The mixed data stored on the data disc. Each pit modulated data, which comprises at least one authentication key or component thereof, is used in authenticating whether at the media and/or pit modulated data is authorized.

A computer or processor driven system, tangible medium including instructions thereon, and process is also provided.

There has thus been outlined, rather broadly, the important features of the invention in order that the detailed description thereof that follows may be better understood, and in order that the present contribution to the art may be better appreciated. There are, of course, additional features of the invention that will be described hereinafter and which will perform the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purposes of description and should not be regarded as limiting.

As such, those skilled in the art will appreciate that the conception, upon which this disclosure is based, may readily be used as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U. S. Patent and Trademark Office and the public, generally, and especially scientists, engineers and practitioners in the art, who are not familiar with patent or legal terms or phraseology, to determine quickly from a cursory inspection, the nature and essence of the technical disclosure of the application. The abstract is neither intended to define the invention of the application, which is measured by the claims, nor is it intended to be limiting as to the scope of the invention in any way.

The above objects of the invention, together with other apparent objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter, which illustrate preferred embodiments of the invention.

BRIEF DESCRIPTION OF THE DRAWINGS

FIG. 1 shows a conventional specification table for a conventional compact disc system.

The same reference numerals refer to the same parts throughout the various Figures.

NOTATIONS AND NOMENCLATURES

Figure 2:
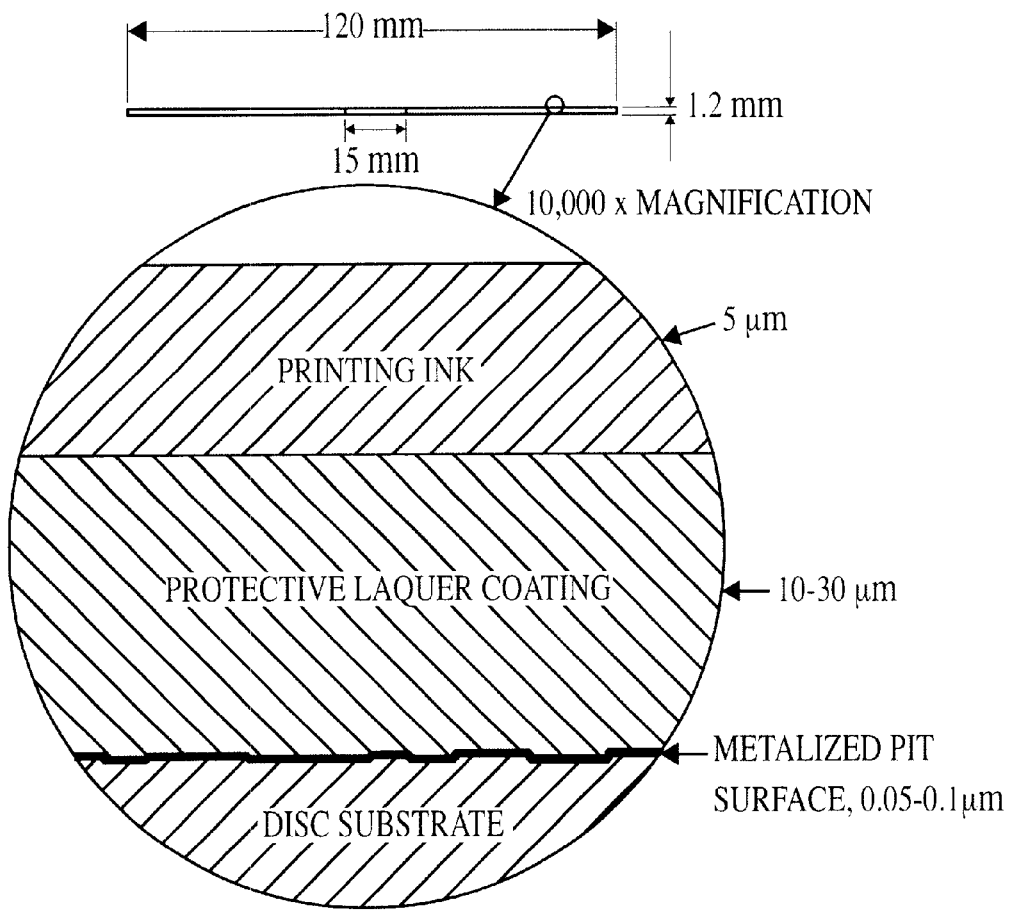
FIG. 2 shows a scale drawing of a conventional CD data surface.
Figure 3:
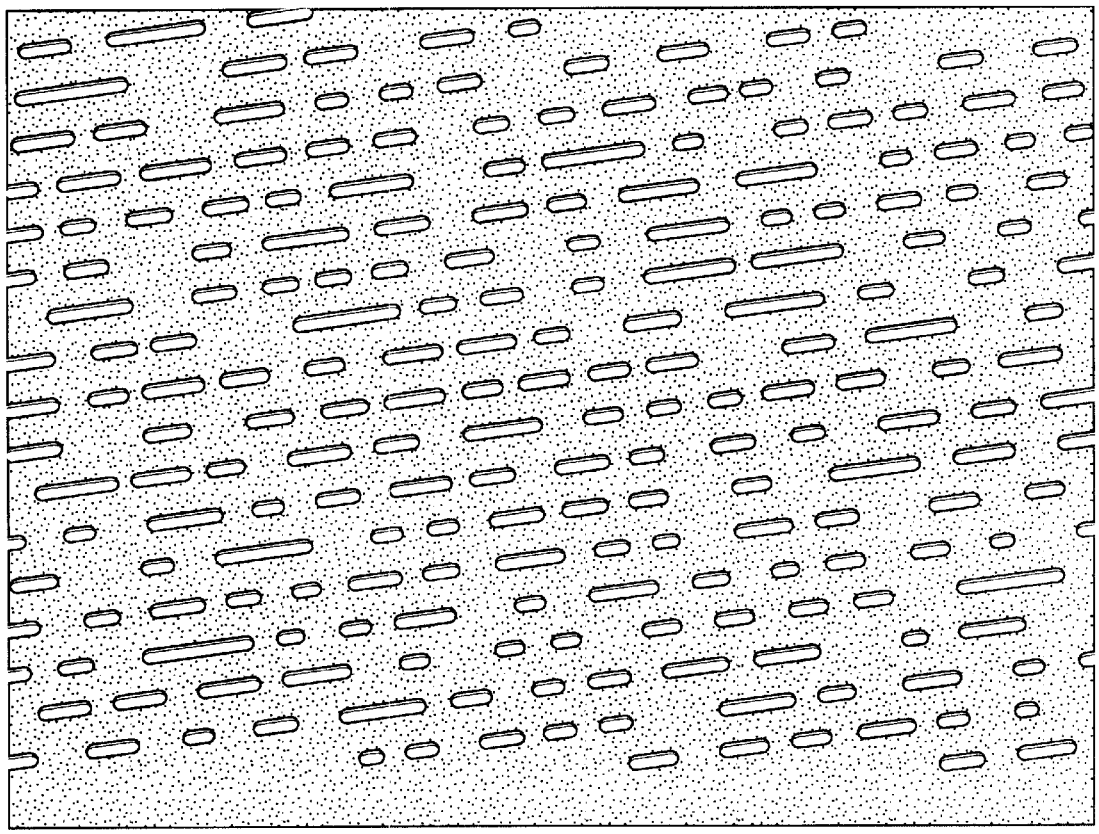
FIG. 3 shows a typical compact disc pit surface.
Figure 4:
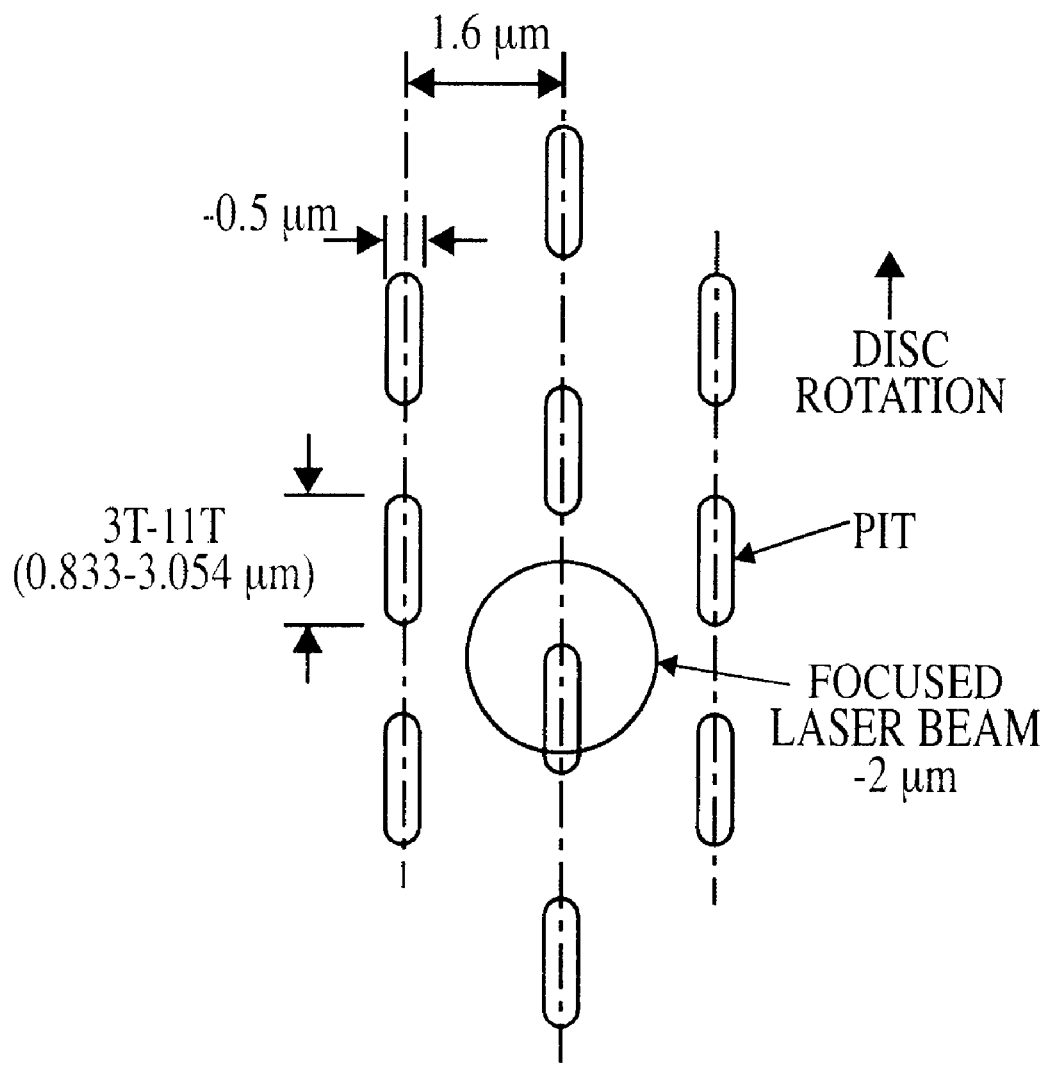
FIG. 4 shows a diagram of a conventional pit track.
Figure 5:
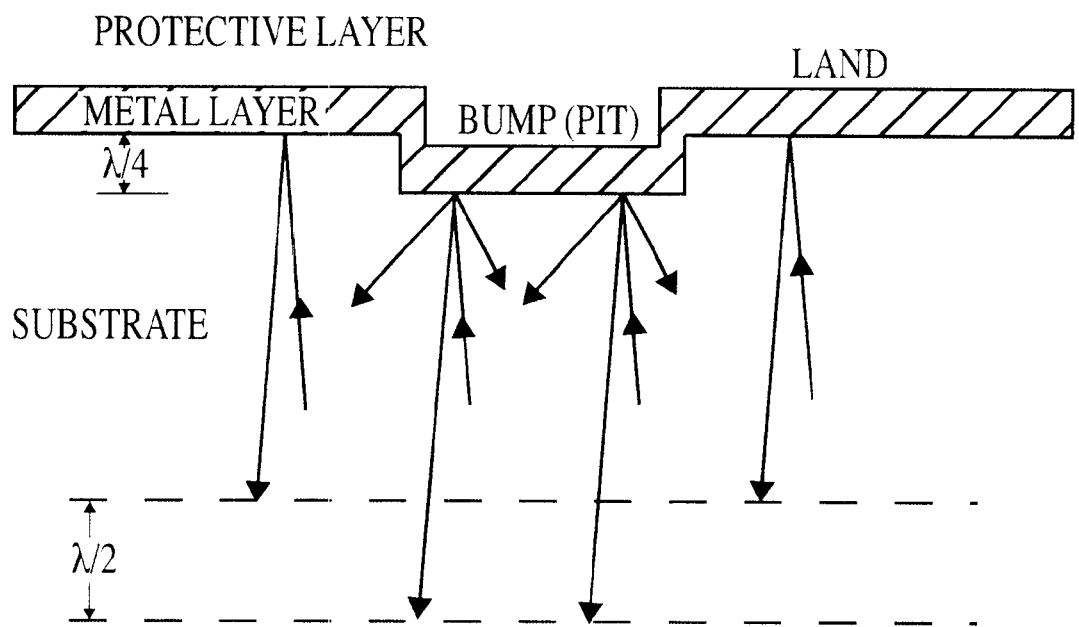
FIG. 5 shows a conventional bump height on a CD surface.
Figure 6:
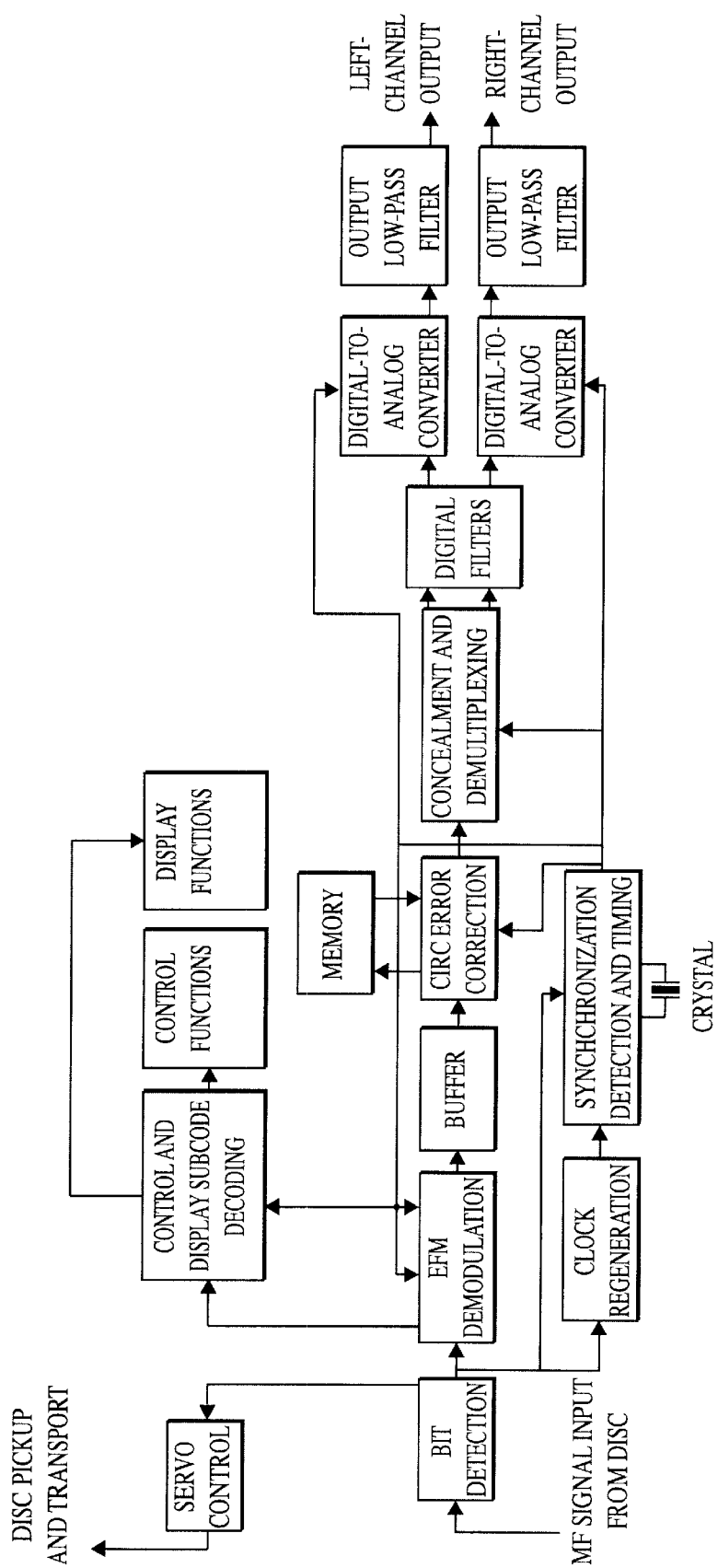
FIG. 6 shows a block diagram of a conventional CD player showing audio path as well as servo and control functions.
Figure 7:
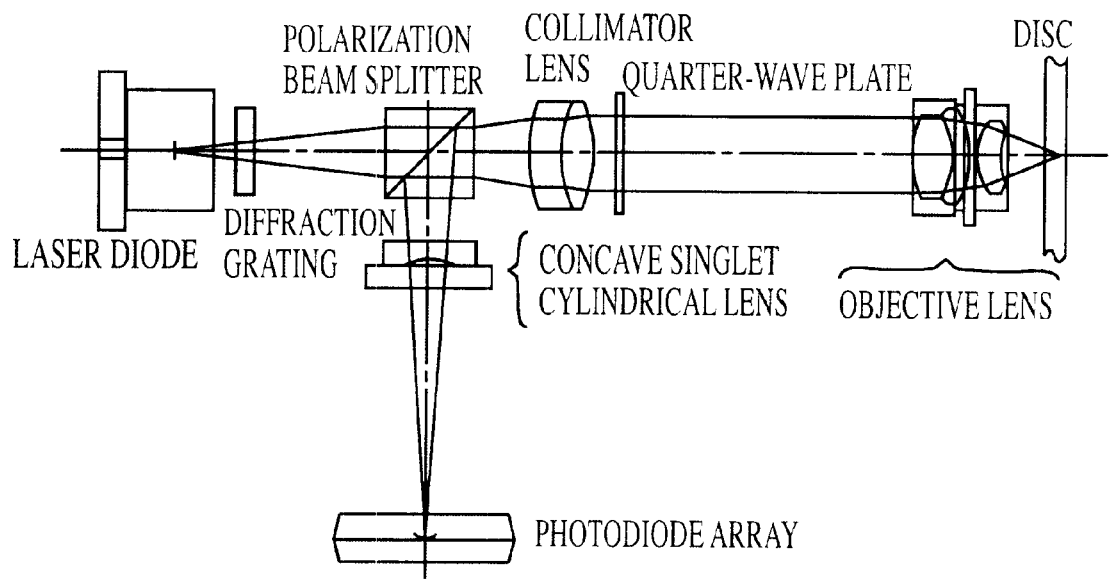
FIG. 7 shows an optical path of a conventional three-beam pickup system.
Figure 8:
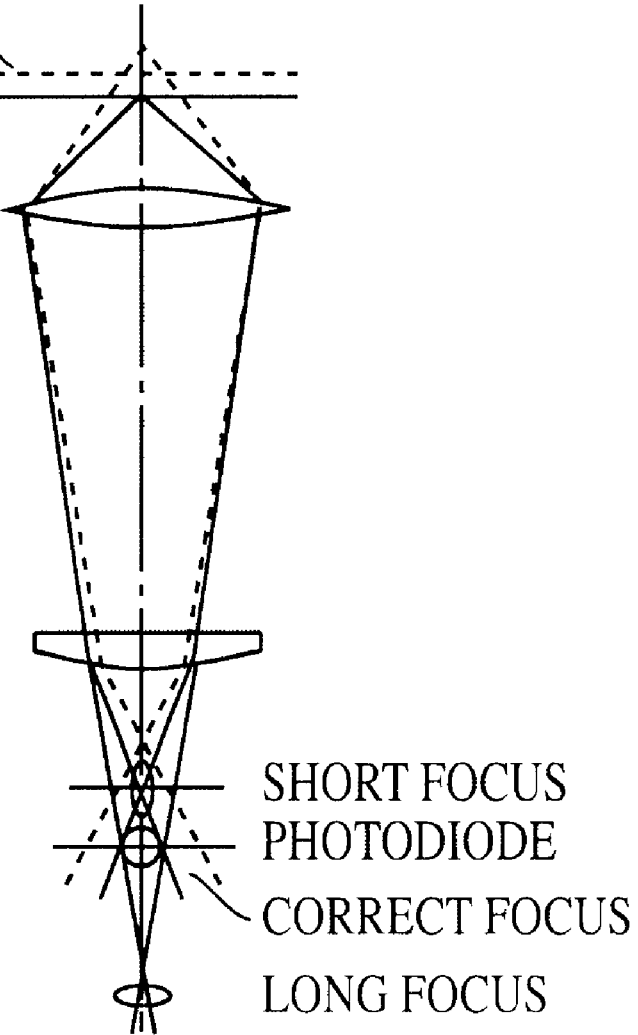
FIG. 8 shows the properties of astigmatism used to generate an auto-focus correction signal in a conventional three-beam pickup system.
Figure 9:
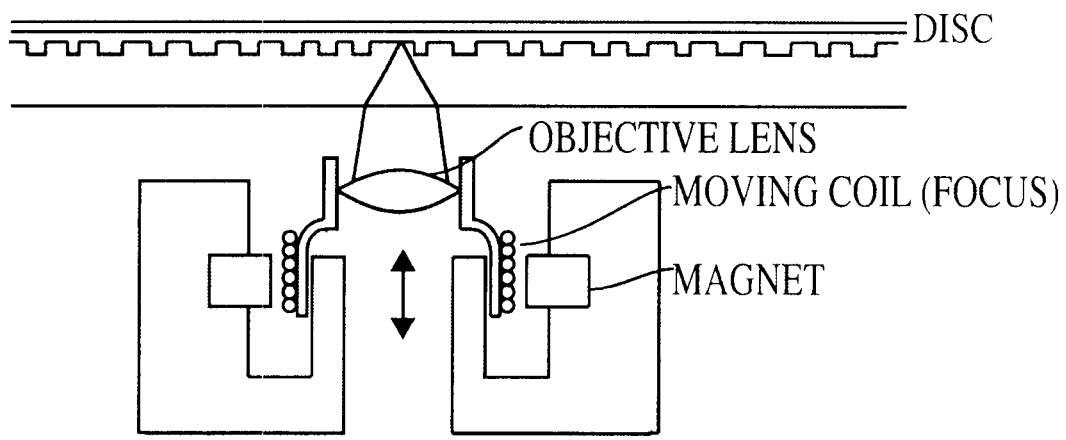
FIG. 9 shows a conventional servo motor used to move the objective lens in an optical path.

The detailed description that follows may be presented in terms of program procedures executed on a computer or network of computers. These procedural descriptions and representations are the means used by those skilled.in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to an apparatus for performing these operations. This apparatus may be specially constructed for the required purpose or it may comprise a general purpose computer as selectively activated or reconfigured by a computer program stored in a computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION OF THE PREFERRED EMBODIMENTS

The present invention relates to a method and system of preventing unauthorized copying of data on data media, including CDs and DVDs. Generally, an authorized CD is designed to require decoding by an authorized disc player. The authorized CD includes certain information used by an authorized CD player for playing music. An unauthorized copied, formed or pressed CD, however, does not have the requisite encryption or decryption key(s) necessary for decoding.

Consequently, a feature and advantage of the present invention is to prevent piracy of audio and/or video data from data discs; that is, to provide greatly enhanced security measures against data disc pirating.

The present invention is based, in part, on my discovery that the authentication key(s) need not necessarily be transferred in the audio/video using conventional hardware and/or software in, for example, CD or DVD players that may be adapted in one or more ways described below.

In the present invention, physical marking of the data media is manifested in three different methods; namely, via pit width modulation, pit depth modulation, and pit track modulation. Each physical mark represents zeros and ones forming part of an authentication key or keys. Singular or multi-level authentication systems may be used for preventing unauthorized copying of audio data or other data on a disc. Similarly, two or three different authentication systems, each of which successively must be deciphered before the audio/video is finally available, may also be used.

Advantageously, the present invention optionally uses three or four different sources for making or compiling a long or compound authentication keys. Thus, in other words, instead of, or in addition to, having a multi-layered decryption or authentication system, the present invention optionally includes a multi-level authentication key, each component of which must be found in order to build the whole key to perform the entire decryption or authentication process.

According to the present invention, there are three ways that authentication keys can be formed and remain hidden. Each method of producing authentication keys is a function of the physical characteristics of a disc that does not normally travel with the audio or video or graphics,data.

Accordingly, the first method is pit width modulation, which requires, in the normal layers of a disc, a variation in the width of a pit. The second method is pit depth modulation, in which pit depth could be varied in a predetermined manner within normal manufacturing tolerances. As in the first method, modulated voltage based on the pit's depth is used to. derive an authentication key or keys. The third method is pit track modulation in which the smooth, continuous spiral/track is modulated on very small levels.

A further advantage of the present invention is that pit width, depth and track modulations are formed on a per track basis or at intervals throughout the disc. This means that the same type of authentication process may be performed for each track to be played, or may be performed throughout the playing/recording process. Thus, it is important to note that each track of a CD or DVD can optionally include a different authentication key.

Figure 10:
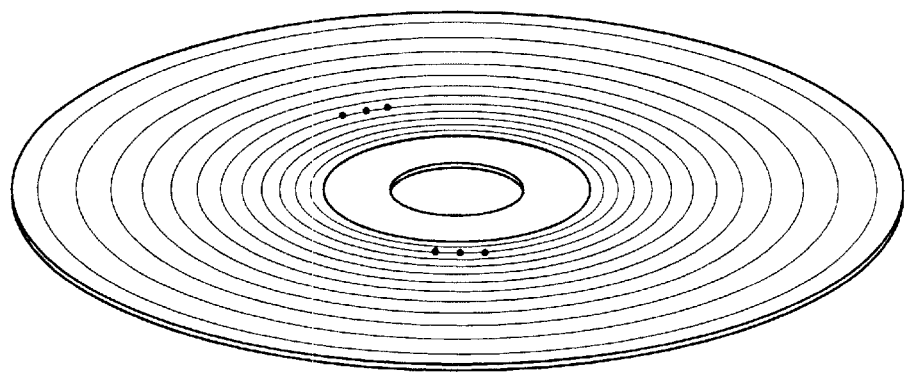
FIG. 10 is an illustration of a spiral modulation configuration used in conjunction with the present invention.

Referring to FIG. 10, the CD, DVD or other data disc is modulated with a predetermined groove configuration, such as a spiral groove, to form a pit modulation.

Pit Depth Modulation

Figure 11:
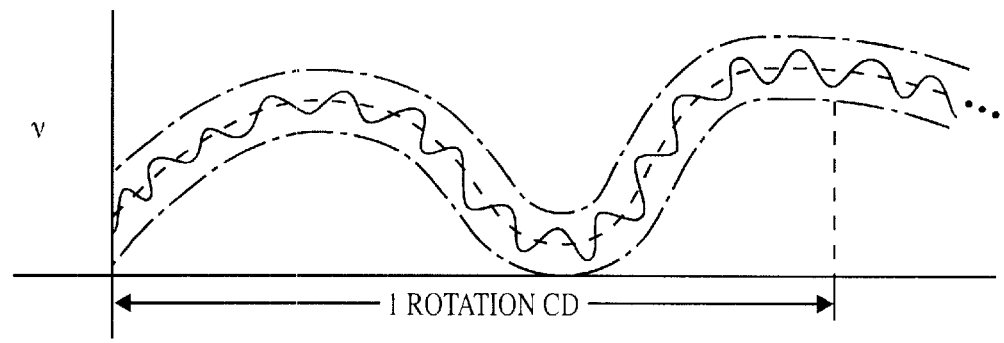
FIG. 11 is a graph, illustrating in sinusoidal form, a pit depth, width or track modulation within a predetermined tolerance.

FIG. 11 is a graph, illustrating in sinusoidal form, a pit modulation within a predetermined tolerance, such as within standard disc manufacturing tolerances. The graph shows the overall sinusoidal shape of actual voltages, within designated tolerances, during one rotation of a CD as a result of the pit depth modulation. (Similar results apply to pit width and/or pit track modulation.)

Figure 12:
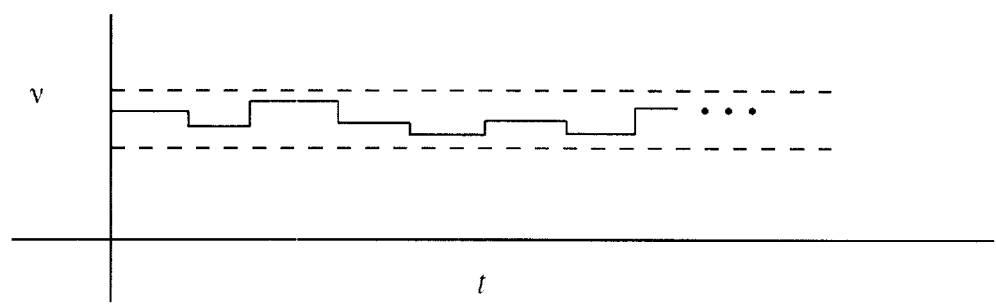
FIG. 12 is a graph, illustrating in step-wise form, a pit depth, width or track modulation within a predetermined tolerance.

FIG. 12 is also a graphic illustration of the voltages curve for a pit modulation, but of a different shape. Here, the graph shows the step-wise shape of actual voltages of the modulation, whether pit depth, pit width or spiral shaped, within predetermined tolerances such that the audio or video generated therefrom is not distorted.

Figure 13:
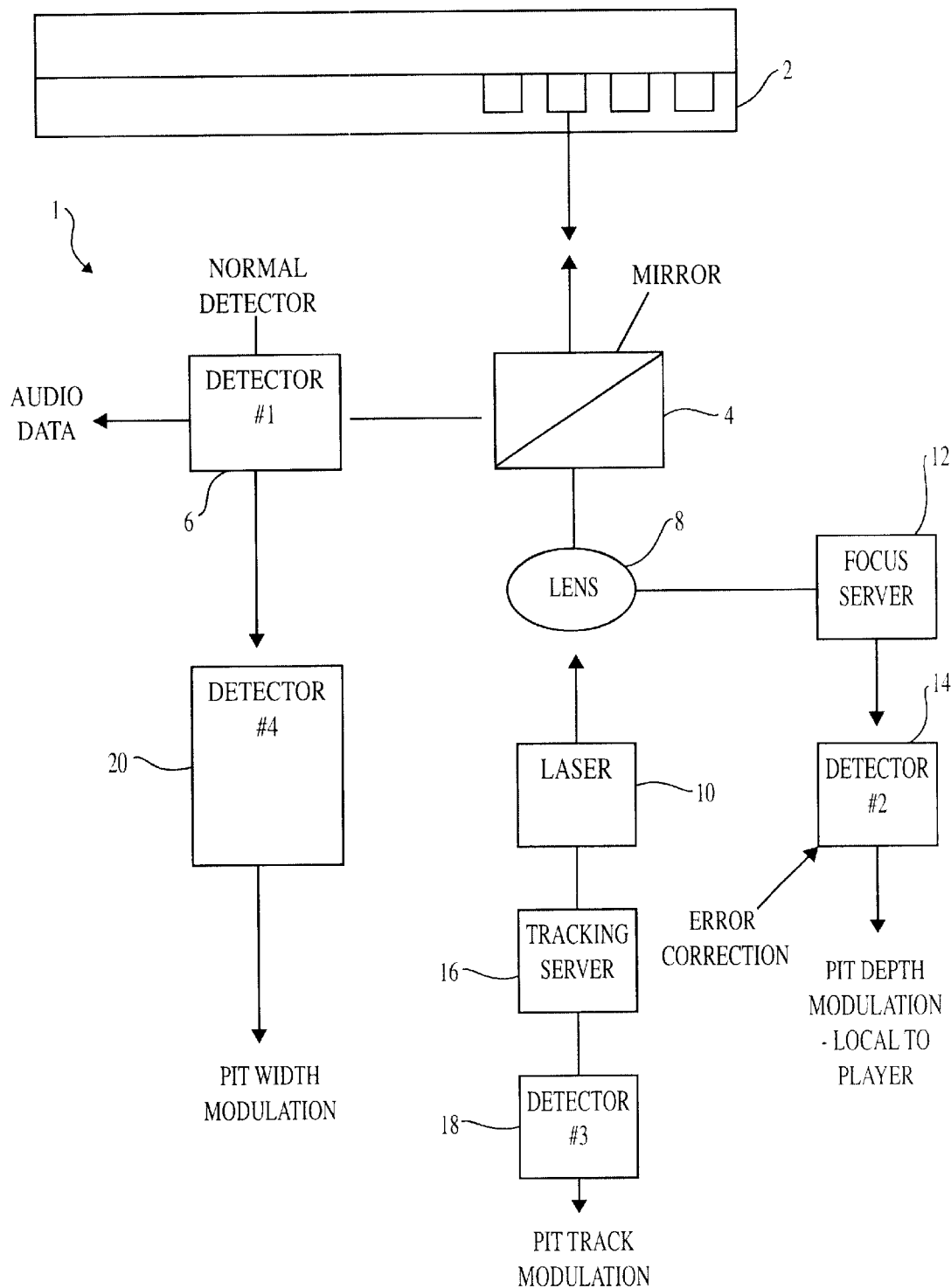
FIG. 13 is a block diagram for a portion of a disk reader according to one embodiment of the present invention.

Depending on the type of modulation employed (i.e. pit width, pit depth or pit track), a disc reader must be correspondingly modified in order to detect the modulation. FIG. 13 is a block diagram of a modified disc reader of the present invention. The modified disc reader 1 includes first, second, third and fourth detectors 6, 14, 18, 20. The first detector is a standard detector 6, which detects data stream based on the modulation. That data stream, representing audio or video data, is output as normal.

Detector 6 detects a typical audio information reflected in the laser beam from disc 2 via a standard reflection mirror 4. A standard laser 10 emits a laser beam through lens 8 and mirror 4 for reading data on the CD 2. Focus server 12 focuses the laser beam on the disc 2.

Additionally, focus server 12 focuses the laser 10 to modulate the pit depth. The second detector 14 detects an additional voltage derived from the focus server 12. Detector 14 is used to monitor and determine the different depths of the disc 2 to detect variations and the authentication keys deriving therefrom. Other standard components of the disc reader 1 are not illustrated.

The physical configuration of disc 2, based on generally slight variations in a pit's depth, width and/or track, produces a modulated authentication key. The physical configuration that produces this modulated key is formed in the disc 2 in any suitable area. A suitable area may be an area of disc 2 that does not have audio data, such as a silent area, or in the initial start-up area of disc 2.

Another suitable area can include the table-of-contents (TOC) area of the disc. This key could be used to not only prevent playback of the contents of the disc, but at the same time prevent recording onto the CD, when such recording equipment becomes available.

Alternatively, the physical configuration may be modulated between, for example, songs or programs. A further alternative is to have the modulation occur within, for example, a song, where the modulation is configured to track closely or substantially correspond to the data on the disc, resulting in very difficult to detect modulation.

To create this disc, the focus is modulated of the server cutting the glass, which is used to make the mold to actually press a disc.during the manufacturing process. Accordingly, the pit depths may be a function of the data themselves as a physical characteristic of the disc. Thus, a whole stack of authorized compact discs that have their pit depth already modulated with a particular company's specifications, are equipped to provide an indication of authorization of the data disc.

Data on a disc typically comprises pits and reflective land surfaces of different lengths and durations, which represent symbols representative of data on the disc. Each pit and land is cut in a photoresist material on the glass of a disc. A chemical solution, such as a gas or etching solution, is used to etch the glass to produce varying depths. Depth variation of the pits is configured within normal or standard tolerance limits, such as ±10–15 percent. These varying depths are sufficient to extract appropriate signals from a focus server 12.

Since the server is inside a CD or DVD player, focus server 12 is a secure device. In addition, the modulated information is not available nor is transmitted in audio form, to the recording player.

To accomplish extra pit depth in designated areas of a disc, several alternatives are available. For example, more chemical or etching solution can be applied to the disc's surface. Or, the etching solution applied thereon may be allowed to sit for a longer period of time. Alternatively, a double photoresist material may be used.

A fourth alternative is to use an incompletely developed photoresist material after exposure. The logical sequence of events begins with exposure of the photoresist material by an intense laser beam. A fully exposed photoresist material results in variation of the hydrofluoric acid's activity rate, even if the glass walls have been cured. This variation means that the hydrochloric acid is ineffective in substantially or totally developing the photoresist material. Consequently, incomplete development of the photoresist material results at deeper parts of the disc.

A fifth alternative that facilitates uneven disc pit depth formation within predetermined tolerances, includes using a specialized additional photoresist material that is uneven or non-uniform; namely, a photoresist material that is uneven or non-uniform in a predetermined manner that corresponds to the predetermined or desired key to be embedded therein or formed thereby.

Moreover, configuring a standard photoresist layer to include an extra area for forming a predetermined key or data, as described in the preceding paragraph above, is yet another method for creating uneven pit depths in a disc. Accordingly, instead of having a uniform photoresist material, the photoresist material may be a little thinner in some places and a little thicker in other places. As a result, after immersion of the photoresist material in a chemical solution, a variation in the disc's pit depth occurs, because the photoresist material would provide different effects when a laser beam subsequently hits the disc's surface.

Advantageously, the present invention encompasses a process that creates variation in disc pit depths within normal predetermined manufacturing tolerances, to generate a code or authentication key or component thereof, used in validating whether a disc is authentic and, therefore, proper to record thereon or play the data contained therein. Various alternatives may be used to implant, impregnate, form or configure the disc to include the predetermined pit depth modulation or variation with desired tolerances. The above-mentioned alternatives for forming varying pit depths are merely exemplary. Any other method may also be used to accomplish this task.

Pit Track Modulation

Another method of varying the physical characteristics of a disc is to vary track portions. This is accomplished by using a laser beam recorder at relatively low frequencies during the making of designated tracks in a disc. The term 'low frequencies' is meant to refer to a frequency lower than the frequency normally used for the symbol or actual pit grade containing the data on the disc.

For instance, a grouping of pits, say 100, in a track may be modulated in such a way that the grouping is shifted, within predetermined tolerance ranges, to the left of actual data for those 100 pits. Or, the grouping may be modulated or shifted to the right for a different number of pits, depending on the desired intended sending signal. Thus, what is meant by low frequency really refers to a low frequency relative to the actual pits on a disc.

One or more of these different track modulations that are optionally dispersed throughout a disc are used to generate a binary security key thereby. This process of generating a security authentication key according to track modulation is optionally independent of all the actual disc data, which may be encrypted or in plain text.

Referring again to FIG. 13, a standard tracking server 16 is used to track pit track modulation. The disc reader 1 is modified to include a third detector 18 that is used to detect track-specific voltage differences for generating the authentication key that results from the track modulation. Alternatively, detectors 6, 14 may be used to detect voltage differences.

Tracking server 16 will produce a low voltage output as the laser beam is radiated onto the disc when server 16 follows the modulation in each track. It will also output voltage that would normally be linear. But, in the present invention, there will be additional modulation to form a key.

The interesting feature about the pit track modulation method, like the pit width modulation method, is that this technique will not produce a security authentication key in the audio output. In addition, the pit track modulation created via the tracking server can operate independent of, or in addition to, pit depth modulation via its focus server.

Generally, as well as in low frequency situations, the main task of tracking server 16 is to follow the eccentricities of each disc as the disc rotates, essentially keeping the laser on the appropriate track. Tracking server 16 continuously produces outputs in order to make sure that the laser beam is directed to the disc's surface and does not jump a track, similar to the task of pickup needles on a standard LP. These outputs take the form of a background sinusoidal variation of voltage at a rate proportional to one complete rotational cycle. See e.g. FIG. 11.

The low frequency data is equal to approximately 100 bits of disc data. In addition, the sinusoidal wave is optionally modulated relative to the disc's rotation at a much higher frequency. The high frequency modulated wave is practically noise-free, because there is no high disc frequency available with which to modulate the track at that rate. Thus, the voltage produced by tracking server 16 would normally look like the sinusoidal wave illustrated in FIG. 11.

Figure 14:
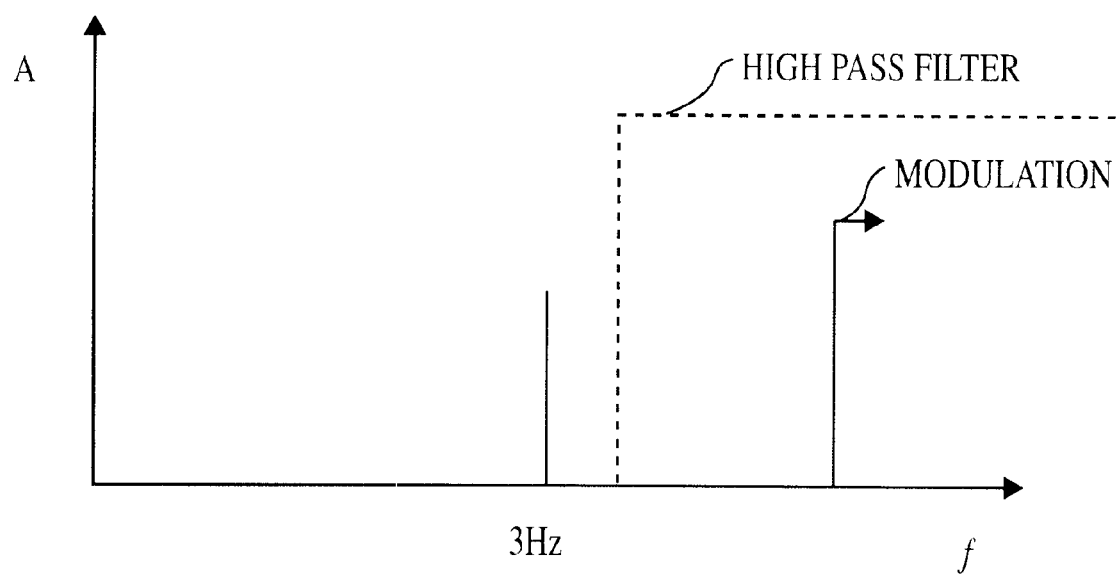
FIG. 14 is an illustration of the spectral content of a frequency.

Moreover, after high-pass filtering, the sinusoidal wave is transformed into the modulation illustrated in FIG. 12. In the frequency domain, the spectral content of the frequency is represented as shown in FIG. 14.

As discussed, the idea is that this track modulated data may be used as an authentication key or as a component or portion of the key. In addition, the above described modulating method advantageously includes error correction.

In conclusion, a potential thief would have to interfere with the laser to attempt to match the track modulation. The pit track modulation method, like the other two methods, raises the level of sophistication for a thief.

The present invention also provides the ability to encrypt the data modulated on the disc. Further, the present invention optionally and advantageously compares the modulated signal to a table of valid modulated signals.

Pit Width Modulation

Figure 15:
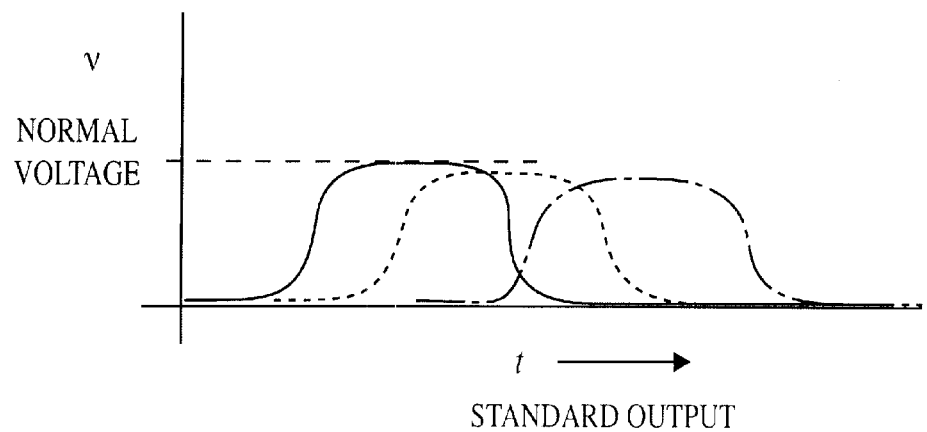
FIG. 15 is a graph of a standard output voltage.
Figure 16:
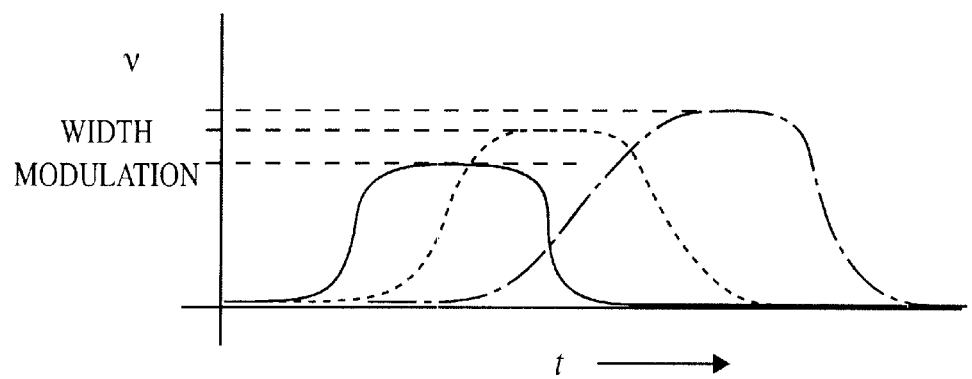
FIG. 16 is a graph of several modulated pit width output voltages.

The third method of varying the physical characteristics of a disc is the pit width modulation method. Because pits and reflective land surfaces have varying lengths, a standard output voltage curve will look like the ones depicted in FIG. 15. When pit widths are modulated, voltages appear as illustrated in FIG. 16, where wider pits result in voltages that rise above normal levels. These voltages are the output of a fourth detector 20 detecting the beam emitting from laser 10.

Figure 17:
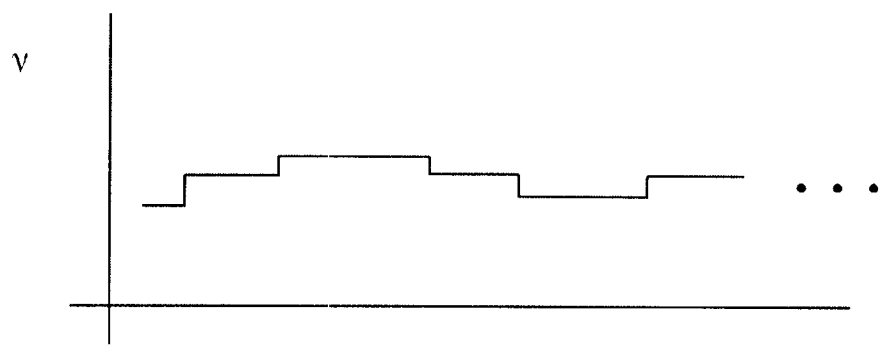
FIG. 17 is a graph of a digitized modulated output voltage.

So, when light from laser 10 radiates on a pit, a voltage is produced, which voltage is detected by detector 20. The laser light is then modulated with respect to a standard pit. Extra pit width (and extra pit depth) variation will produce varying voltages, as illustrated in FIGS. 16 and 17.

Detector 20 may then be used to detect the pit width modulation to determine the authentication key, keys and/or components of keys to be used in the present invention as described herein. Thus, card reader 1 is modified to detect the pits that are width modulated, via detector 20, and will thereby detect an additional voltage produced to determine a key. Thus, detector 20, as described above, determines authentication key data that is being modulated via pit width modulation.

Again, voltage changes due to pit width variation are not transferred in the audio output signal, because error correction will correct the audio, which might include some of the changes. Thus, voltage changes dissipate as soon as the standard error correction mechanism is used to correct for the modulation. In addition, the standard digital output will be zeros and ones that would remove any voltage changes/variations, and transmit the data as a nicely squared signal.

It is important to note that error correction is always at work in the present invention. See FIG. 13. Information read from a CD will require error correction because of normal day-to-day irregularities such as fingerprints, coffee stains, etc. Therefore, a variation in the laser beam output from detector 6, in FIG. 13, is likely.

Error correction essentially ensures that a signal produced by tracking server 16 or detectors 14, 18, 20 will be a valid signal. Error correction also ensures the possibility of being able to expect additional detector 14 or tracking server 16 to have a signal of a particular magnitude to compare to a look-up table. (Note that in any case, focus and tracking servers 12, 16, function to eliminate irregularities like a fingerprint, which accidentally diverts servers 12, 16.) The second detector 14 extracts the modulation from focus server 12, which operates in a closed loop, for example, with lens 8. Thus, the present invention is taking off that voltage, doing some filtering, slicing and then extracting the data.

To summarize, the first, second, third and fourth detectors 6, 14, 18, 20, (e.g., first, second, third and fourth detecting devices) detects all modulation produced from each of the pit width, pit depth and pit track modulation methods.

The fourth detector 20 is used to detect the pit width modulation to determine the decryption key(s) and/or components of key(s) to be used in the present invention as described herein. It detects the pits that are width modulated, and will thereby detect an additional voltage produced to determine the key. In other words, detector 20 determines the authenticating key data that has been modulated via pit width modulation.

The third detector 18 is used to detect the pit track modulation. It detects the pits that are track modulated, and will detect an additional voltage produced to determine an authentication key. Thus, detector 18 determines authentication key data that has been modulated via pit track modulation.

The second detector 14, also a focus detector, is used to detect the pit depth modulation to determine authentication key(s) and/or components of key(s) to be used in the present invention as described herein. It detects the pits that are depth modulated, and will detect an additional voltage produced to determine the key. In other words, focus detector 14 determines the authentication key data that has been modulated via pit depth modulation.

Pit width modulation data may also be used, as described above, in combination with one or more of the above methods, to perform an important function; namely, to verify a data stream that has been modulated on the disc, and then used to determine the relevance and/or validity of other modulated data hidden or formed within the physical characteristics of the data disc.

The main reason for providing one or more of the above-mentioned modulation techniques that are based on the physical characteristics of the disc, is to produce another obstacle to a potential pirate who might be starting from scratch by cutting his own disc. Again, the main purpose of having a physical key of one or more of these types is that the keys represent 'lost keys' that do not appear in the output data. Moreover, it principally overcomes the possibility of making a direct data transfer from one disc to another.

In other words, all three modulation methods could be used to derive physical keys on a CD, so that if one key is unlocked, progression onto the next key is permitted, etc. One would not have to use these three methods necessarily. One could use one method, or any of the three methods or variations.

Conceptually, the present invention provides the ability to not only have authentication keys on a track-by-track basis, but also multiple component keys that need to be combined, multiple keys, and the like, for validation and for purposes of playing a disc.

An alternative embodiment of the present invention employs the use of a address pointer, which instructs a player's server to go to a designated disc location containing the decryption key(s), and read that location. There are many variations on the theme on what this data represents. But the main theme is that it is a key, or part of a key, of several different security authentication methods, or a part of a key of one encryption/decryption method.

Again, these physical keys are generally hidden keys. The keys are hidden in the sense that all are lost and not included in the audio output. In addition, standard error correction is also provided, because the actual modulation obtained from detectors will contain natural errors that occur on a disc. All three methods described herein are basically modulation methods where physical hidden characteristics, or hidden data, or embedded signaling information exists. That information is going to be a part of, or separate keys, to decrypt the audio data.

Figure 18:
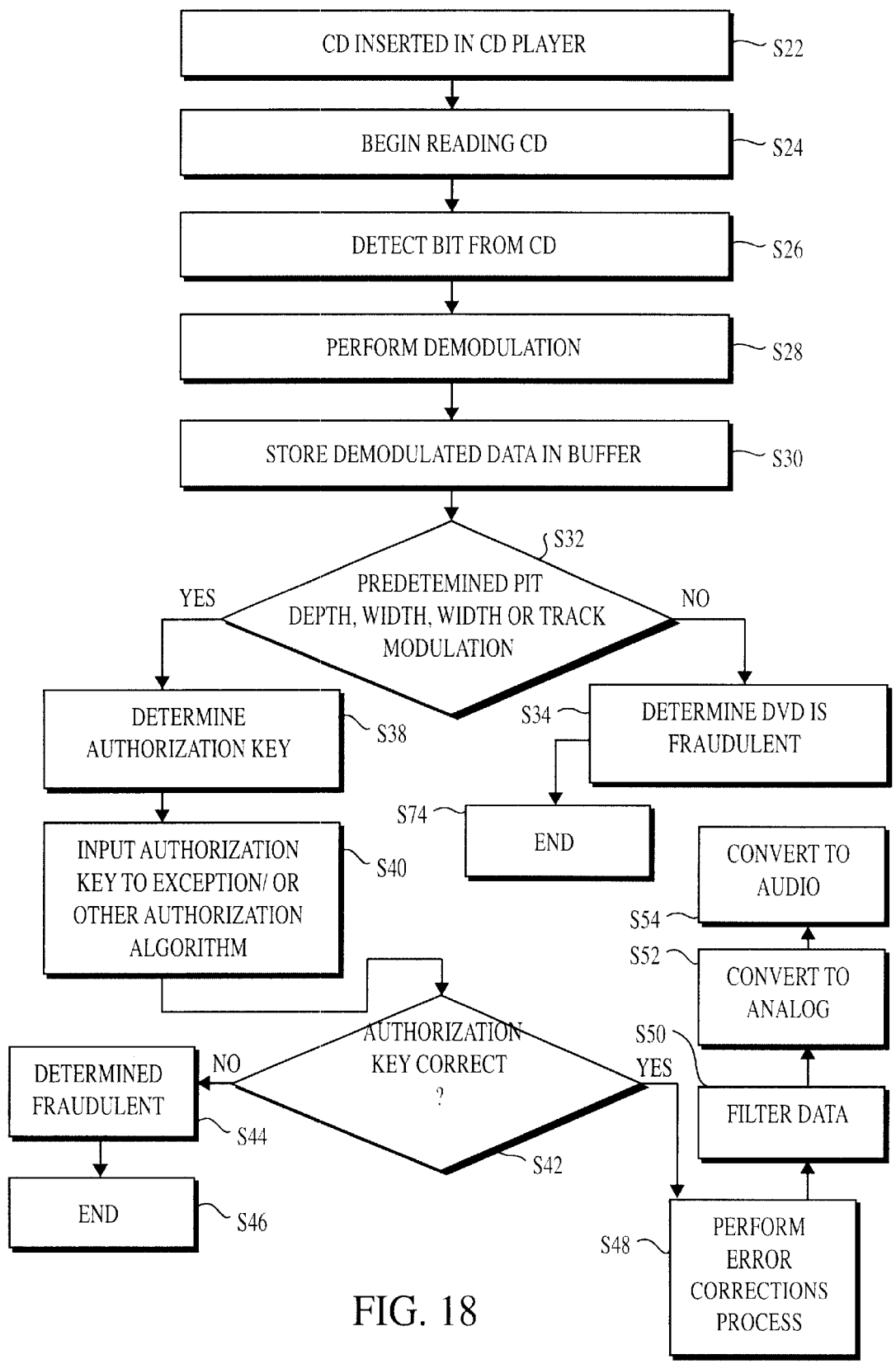
FIG. 18 shows a flow chart of the decision logic describing the authentication process of a CD to be played on a CD player.

FIG. 18 shows a flow chart of the decision logic describing operation of a disc player when attempting to play a CD in accordance with one embodiment of the invention. For simplicity, the following steps are identified in the drawings by the letter "S" preceding the reference numeral; that is, Step 22 is shown in the drawings as "S22", etc.

The process begins at Step 22 when CD 2 is inserted into a CD player. The player begins reading the CD 2, (Step 24), by detecting bits from the disc's surface (Step 26). Once the data is recovered, the data is modulated using, for example, eight-to-fourteen modulation (Step 28). The demodulated data is sent to a buffer (Step 30).

At Step 32, (S32), the player's circuitry or processes must determine whether the data on disc 2 is pit depth, pit width and/or pit track modulated. If no pit modulated data is read, the disc is determined to be fraudulent (Step 34), and the disc player ends playback activity (Step 36). On the other hand, if it is found that the disc 2 contains pit depth, width and/or track modulated data, the next Step 38 is to read that data and determine authentication key(s) or components thereof, an operation performed by an authentication algorithm located within an authentication module (as at FIG. 28).

Once each authentication key is read into the authentication algorithm, (Step 40), it is then determined whether each authentication key is correct (Step 42). The authentication algorithm in a CD player (not shown) will have a component corresponding to the authentication key(s) on disc 2. If comparison of the component with the key(s) does not match, CD 2 is determined to be fraudulent (Step 44) and playback activity ends (Step 46).

If, on the other hand, it is determined that the component correctly matches the authentication key(s), the player's circuity is triggered to begin the error removal process (Step 48) in which errors are removed, data is filtered (Step 50) and ultimately converted to sensible audible output data (Steps 52, 54). While the above description focuses on a particular sequence of process steps, the present invention may alternatively be used via a different sequence of the above described steps.

Figure 19:
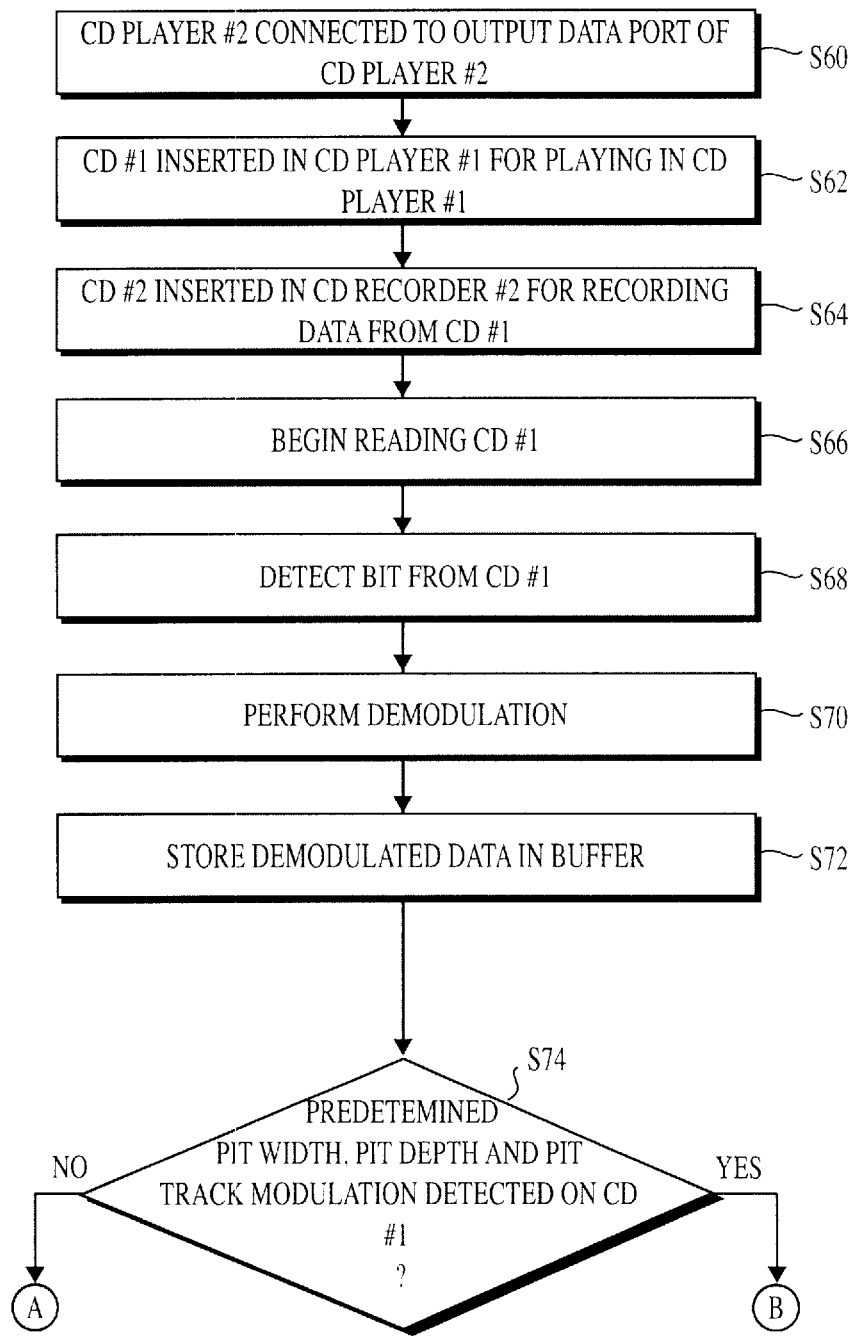
FIGS. 19–22 show a flow chart of the decision logic describing the authentication process of a CD to be copied by a CD recorder.

FIG. 19 illustrates a flow chart of the decision logic describing operations when a first CD plays the data to be recorded by a second CD. For simplicity, the CD player will be referenced as player #1, and the CD recorder will be referenced as recorder #2. Also, the first CD played by player #1 will be referenced as CD #1, and the second CD recorded by recorder #2 will be referenced as CD #2.

At inception, (Step 60 or S60), CD player #1 is connected to the output port of recorder #2, or other standard means for capturing the output of player #1. Playback begins when CD #1 is inserted into player #1 (Step 62). Recording begins when CD #2 is inserted into recorder #2 (Step 64). The next step in CD player #1 is the reading of CD #1, (Step 66), by detecting bits contained on the surface of CD #1 (Step 68).

Once the data is recovered, the data is demodulated using, for example, eight-to-fourteen modulation or other standard modulation (Step 70). The demodulated data is transferred and stored in a buffer, (Step 72).

Figure 20:
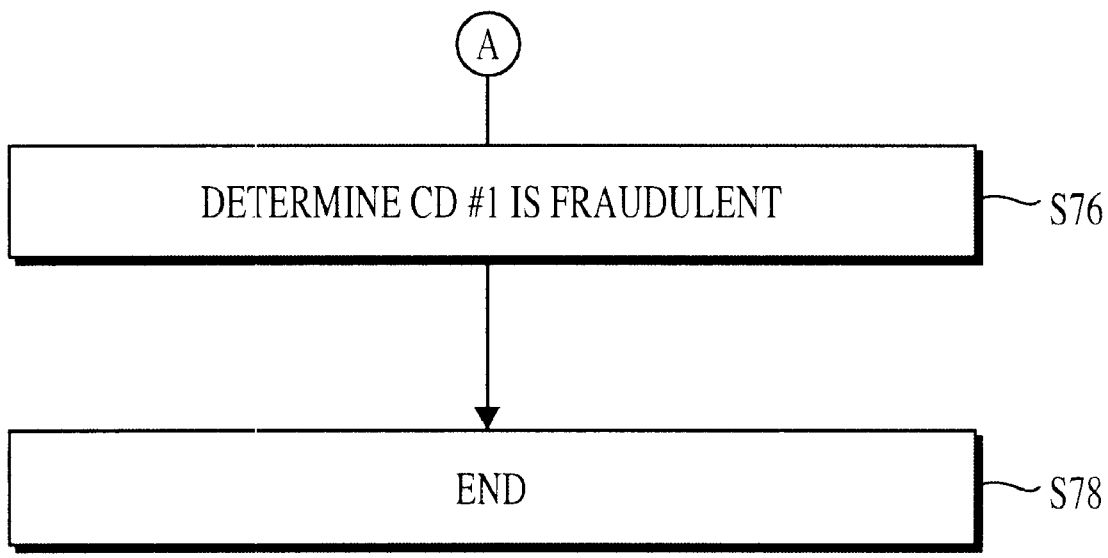

At Step 74 (S74) depicted in FIG. 19, the player's circuitry must determine whether the data on CD #1 contains pit depth, width and/or track modulation. If not, the disc is determined to be fraudulent (Step 76), and player #1 ends playback activity (Step 78). See FIG. 20.

Figure 21:
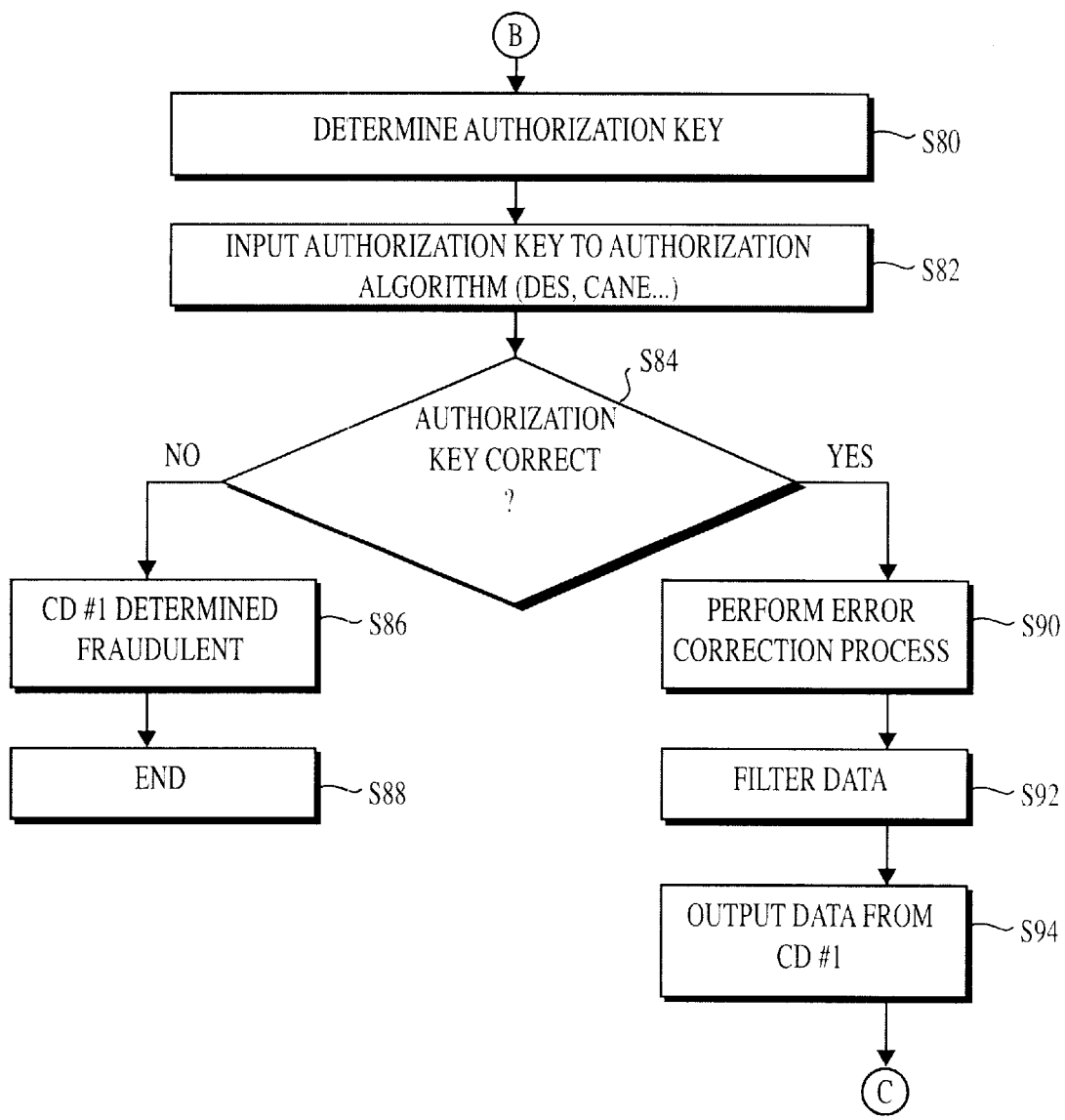

On the other hand, if it is found that the CD #1 contains predetermined errors, the next Step 80 (S80) in FIG. 21 is to read the modulated data and determine authentication key(s) and/or components thereof. Any standard authentication algorithm may be used, such as data encryption standard (DES) and the like, located within the authentication module of CD player #1. See FIG. 21.

Once the authentication key(s) is/are read into the authentication algorithm, (Step 82), in a standard manner, and it is then determined whether the authentication key(s) and/or components thereof is/are correct (Step 84). The authentication algorithm in CD player #1 will have a component corresponding to the authentication key(s) on CD #1. If comparison of the component with the key(s) does not match, CD #1 is determined to be fraudulent (Step 86), and playback activity ends (Step 88).

If, on the other hand, it is determined in S84 that the component correctly matches the authentication key(s), the player's circuitry is triggered to begin the error removal process, (Step 90), in which errors are removed, and the data is filtered (Step 92) and ultimately converted to sensible audible output data (Step 94).

Figure 22:
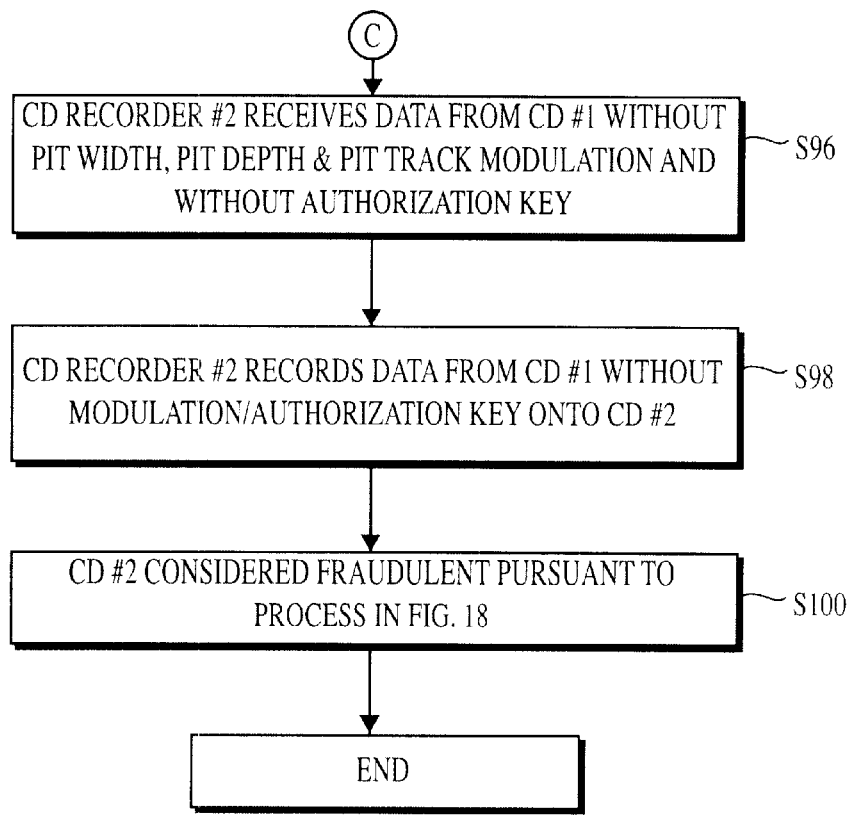

Referring to FIG. 22, at this juncture, the authentication process for playing the CD is completed, and recorder #2 receives the audio data from CD #1 (Step 96). This data is free of pit modulated data and all authentication keys. Upon receipt, CD recorder #2 records the data onto CD #2, a copy (Step 98). If CD #2 is later inserted into a CD player of the present invention, (e.g., a modified-CD player equipped with a modified disc reader to detect pit depth, width and track modulations), it will be determined to be a fraudulent CD pursuant to the above-mentioned process of FIG. 13, because CD #2 does not contain the requisite pit depth, width and/or track modulations for authentication, since these modulations were not transferred in the data, such as audio data (Step 100).

Figure 23:
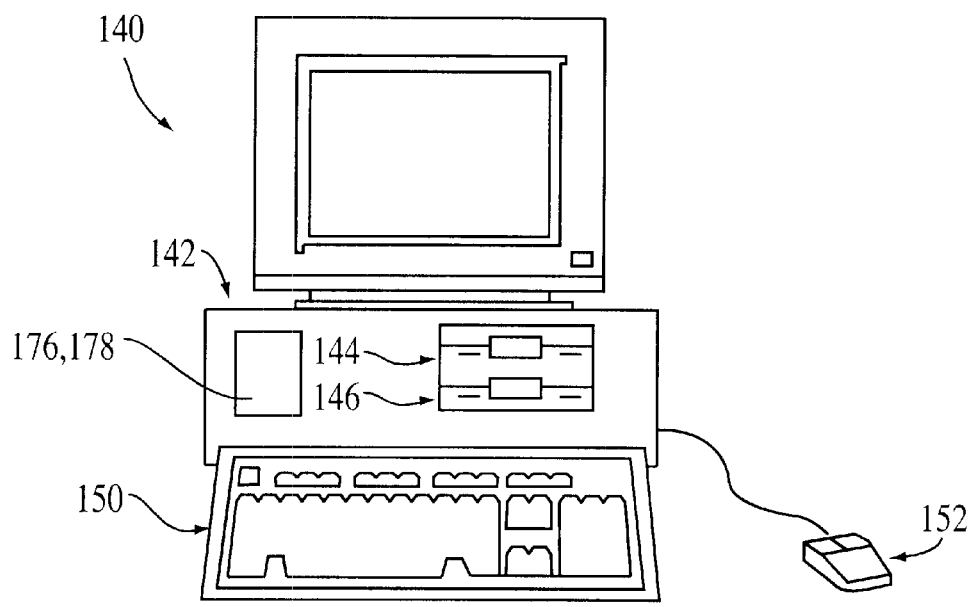
FIG. 23 is an illustration of a main central processing unit for implementing the computer processing in accordance with a computer implemented embodiment of the present invention, when the data player and/or recorder is part of a personal computing system.

FIG. 23 is an illustration of a main central processing unit for implementing the computer processing in accordance with a computer implemented embodiment of the present invention, when the data player and/or recorder is part of a personal computing system. The procedures described above may be presented in terms of program procedures executed on, for example, a computer or network of computers.

Viewed externally in FIG. 23, a computer system designated by reference numeral 140 has a central processing unit 142 having disc drives 144 and 146. Disc drive indications 144, 146 are merely symbolic of a number of disc drives that might be accommodated by the computer system. Typically these would include a floppy disc drive such as 144, a hard disc drive (not shown externally) and a CD ROM indicated by slot 146. The number and type of drives varies, typically with different computer configurations. Disc drives 144, 146 are in fact optional, and for space considerations, may be easily omitted from the computer system used in conjunction with the production process/apparatus described herein.

The computer also has an optional display 148 upon which information is displayed. In some situations, a keyboard 150 and a mouse 152 may be provided as input devices to interface with the central processing unit 142. Then again, for enhanced portability, the keyboard 150 may be either a limited function keyboard or omitted in its entirety. In addition, mouse 152 may be a touch pad control device, or a track ball device, or even omitted in its entirety as well. In addition, the computer system also optionally includes at least one infrared transmitter 176 and/or infrared receiver 178 for either transmitting and/or receiving infrared signals, as described below.

Figure 24:
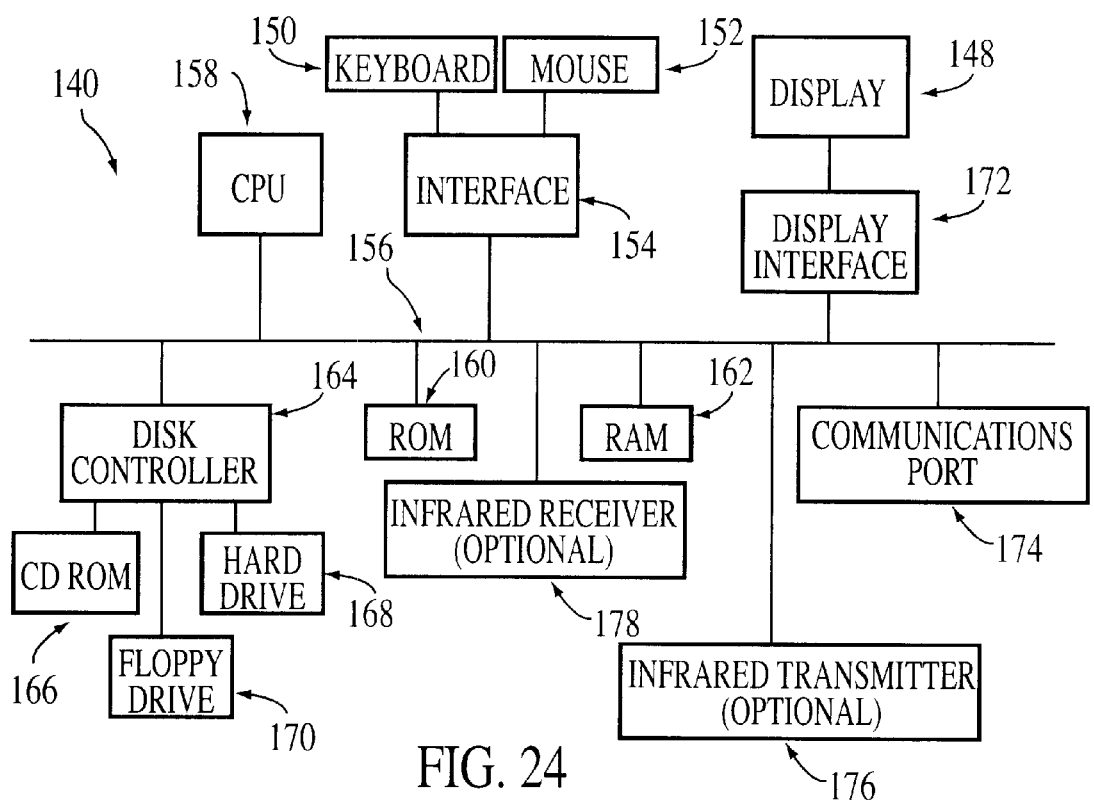
FIG. 24 illustrates a block diagram of the internal hardware of the computer of FIG. 23.

FIG. 24 illustrates a block diagram of the internal hardware of the computer of FIG. 23. A bus 156 serves as the main information highway inter-connecting the other components of the computer. CPU 158 is the central processing unit of the system, performing calculations and logic operations required to execute a program. Read only memory (ROM) 160 and random access memory (RAM) 162 constitute the main memory of the computer. Disc controller 164 interfaces one or more disc drives to the system bus 156. These disc drives may be floppy disc drives such as 170, or CD ROM or DVD (digital video disc) drives such as 166, or internal or external hard drives 168. As indicated previously, these various disc drives and disc controllers are optional devices.

A display interface 172 interfaces display 148 and permits information from the bus 156 to be displayed on the display 148. Again as indicated, display 148 is also an optional accessory. For example, display 148 could be substituted or omitted. Communication with external devices, for example, the components of the apparatus described herein, occurs using communications port 174. For example, optical fibers and/or electrical cables and/or conductors and/or optical communication (e.g., infrared and the like) and/or wireless communication (e.g., radio frequency (RF) and the like) can be used as the transport medium between the external devices and communication port 174.

In addition to the standard components of the computer the computer also optionally includes at least one of infrared transmitter 176 or infrared receiver 178. Infrared transmitter 176 is used when the computer system is used in conjunction with one or more of the processing components/stations that transmits/receives data via infrared signal transmission.

Figure 25:
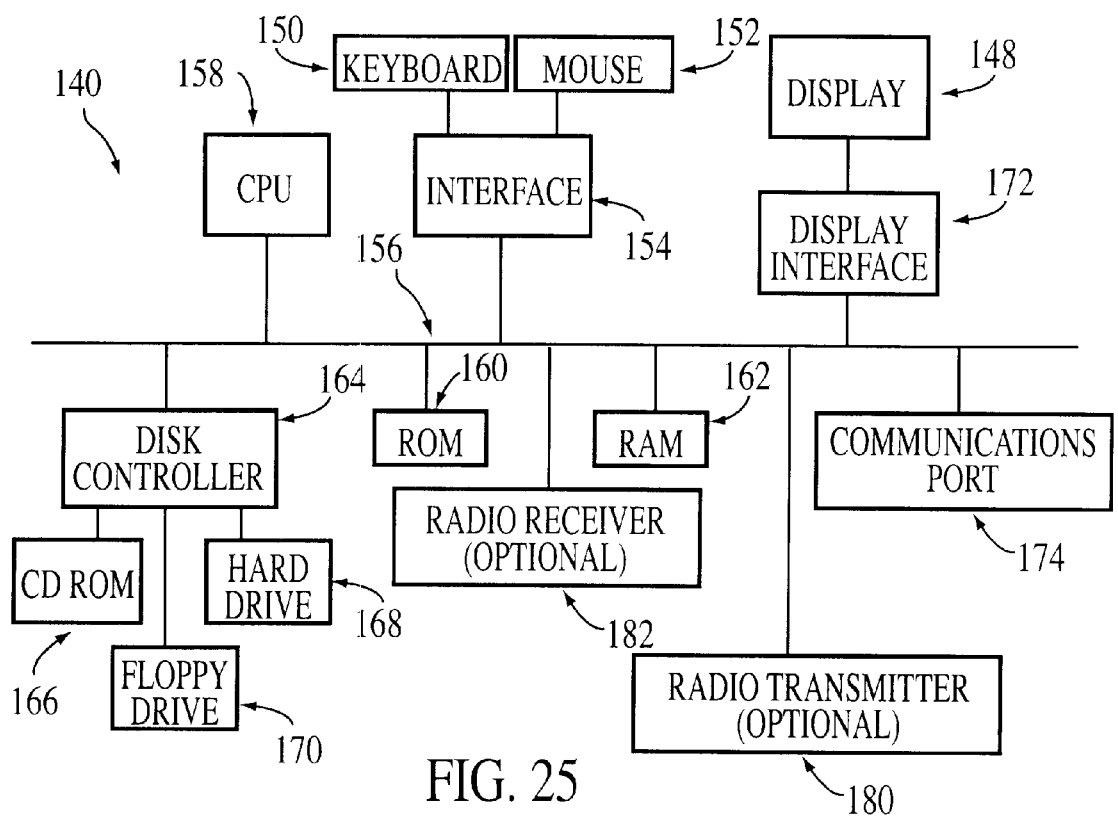
FIG. 25 is a block diagram of the internal hardware of the computer of FIG. 23 in accordance with a second embodiment.

FIG. 25 is a block diagram of the internal hardware of the computer of FIG. 23 in accordance with a second embodiment. In FIG. 25, instead of utilizing an infrared transmitter or infrared receiver, the computer system uses at least one of a low power radio transmitter 180 and/or a low power radio receiver 182. The low power radio transmitter 180 transmits the signal for reception by components of the production process, and receives signals from the components via the low power radio receiver 182. The lower power radio transmitter and/or receiver 180, 182 are standard devices in industry.

Figure 26:
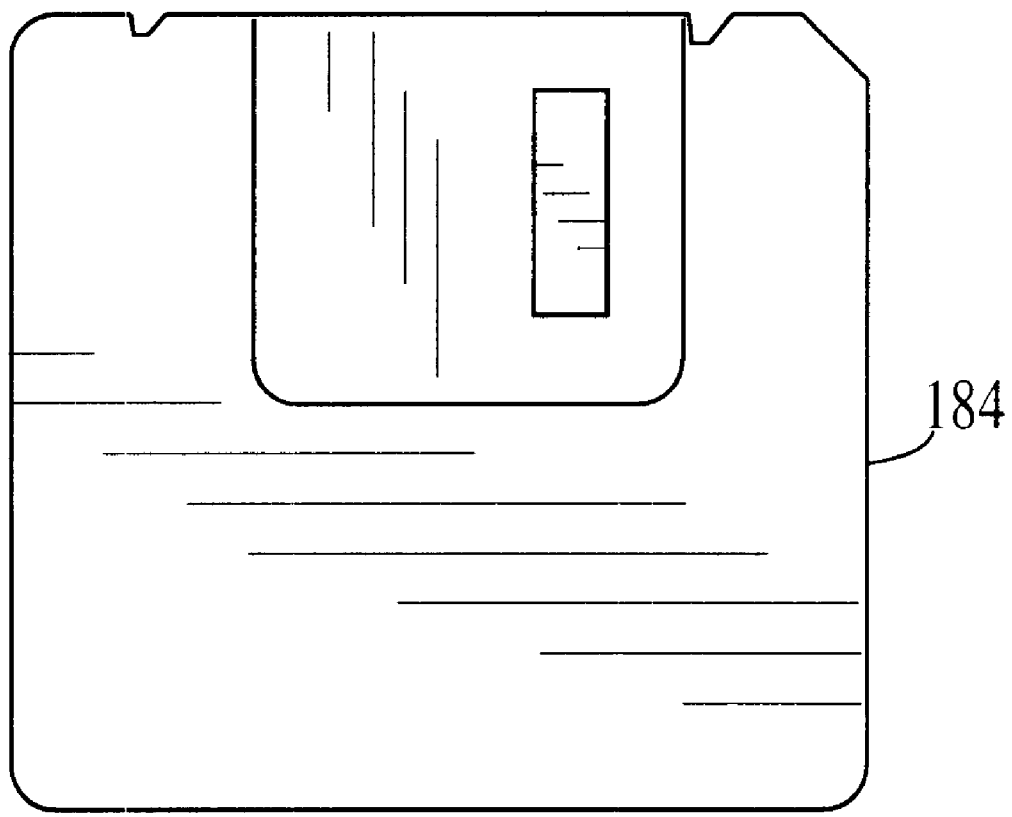
FIG. 26 is an illustration of an exemplary memory medium that can be used with disc drives illustrated in FIGS. 23–25.

FIG. 26 is an illustration of an exemplary memory medium which can be used with disc drives illustrated in FIGS. 23–25. Typically, memory media such as floppy discs, or a CD ROM, or a digital video disc will contain, for example, a multi-byte locale for a single byte language and the program information for controlling the computer to enable the computer to perform the functions described herein. Alternatively, ROM 160 and/or RAM 162 illustrated in FIGS. 24–25 can also be used to store the program information that is used to instruct the central processing unit 158 to perform the operations associated with the production process.

Although processing system 140 is illustrated having a single processor, a single hard disc drive and a single local memory, processing system 140 may suitably be equipped with any multitude or combination of processors or storage devices. Processing system 140 may, in point of fact, be replaced by, or combined with, any suitable processing system operative in accordance with the principles of the present invention, including sophisticated calculators (and hand-held), laptop/notebook, mini, mainframe and super computers, as well as processing system network combinations of the same.

Conventional processing system architecture is more fully discussed in *Computer Organization and Architecture*, by Williams Stallings, McMillan Publishing Co. (3rd ed. 1993); conventional processing system network design is more fully discussed in *Data Network Design*, by Darren L. Spohn, McGraw-Hill, Inc. (1993), and conventional data communications is more fully discussed in *Data Communications Principles*, by R. D. Gitlin, J. F. Hayes and S. B. Weinstein, Plenum Press (1992) and *The Irwin Handbook of Telecomunications*, by James Harry Green, Irwin Professional Publishing (2nd ed. 1992). Each of the foregoing publications is incorporated herein by reference.

Alternatively, the hardware configuration may be arranged according to the multiple instruction multiple data (MIMD) multiprocessor format for additional computing efficiency. The details of this form of computer architecture are disclosed in greater detail in, for example, U.S. Pat. No. 5,163,131; Boxer, A., "Where Buses Cannot Go", IEEE SPECTRUM, February 1995, pp. 41–45; and Barroso, L. A. et al., "RPM: A Rapid Prototyping Engine for Multiprocessor Systems", IEEE COMPUTER, February 1995, pp. 26–34, all of which are incorporated herein by reference.

In alternate preferred embodiments, the above-identified processor, and in particular microprocessing circuit 158, may be replaced by or combined with any other suitable processing circuits, including programmable logic devices, such as PALs (programmable array logic) and PLAs (programmable logic arrays), DSPs (digital signal processors), FPGAs (field programmable gate arrays), ASICs (application specific integrated circuits), VLSIs (very large scale integrated circuits) or the like.

Figure 27:
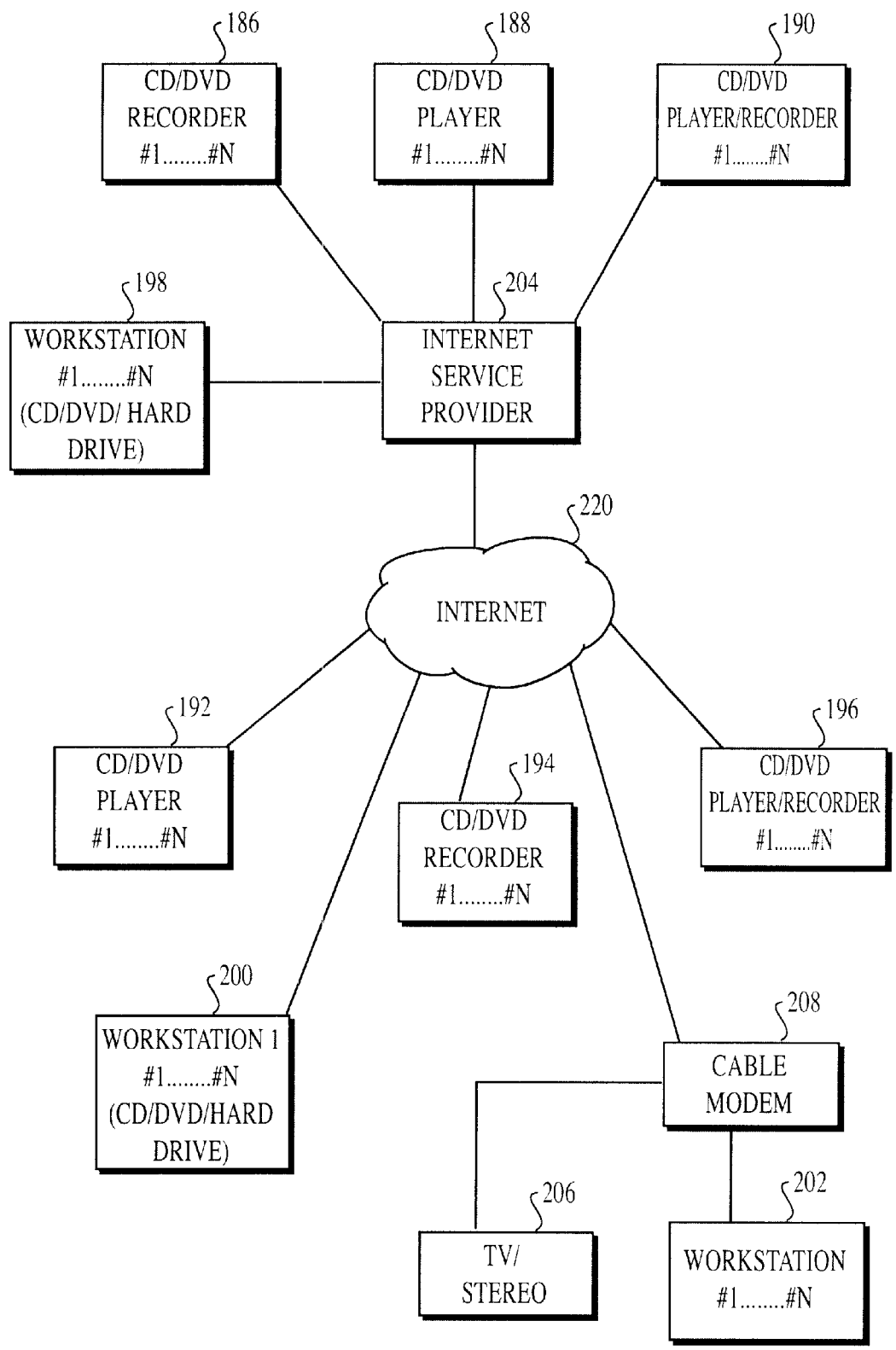
FIG. 27 shows a plurality of disc player, disc recorders and workstations connected to a global network, such as the Internet.

FIG. 27 shows a plurality of disc players and disc recorders 186, 188, 190, 192, 194, 196 and work stations 198, 200, 202 connected to a global network, such as the Internet 220, via an Internet Service Provider 204, in accordance with one embodiment. The above system also accommodates Internet access to electronic audio/video data files through home electronic equipment, such as television/stereos 206 and cable/modem 208. Thus, data may emanate from, or be transmitted to, any one of these stations or devices.

Figure 28:
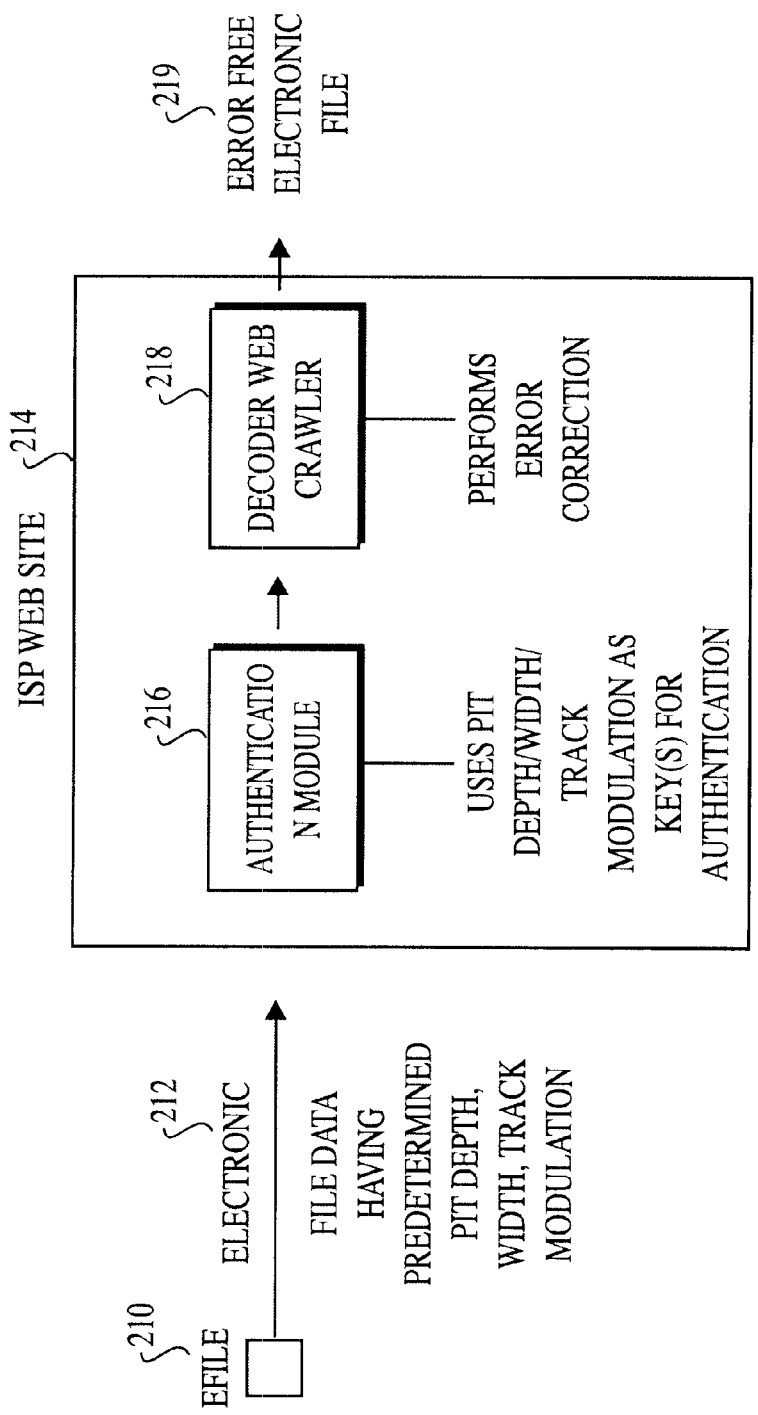
FIG. 28 shows a block diagram of the process by which pit depth, width and track modulation data are transmitted in an electronic audio/video data file, and are used as a key or keys for authenticating the efile.
Figure 29:
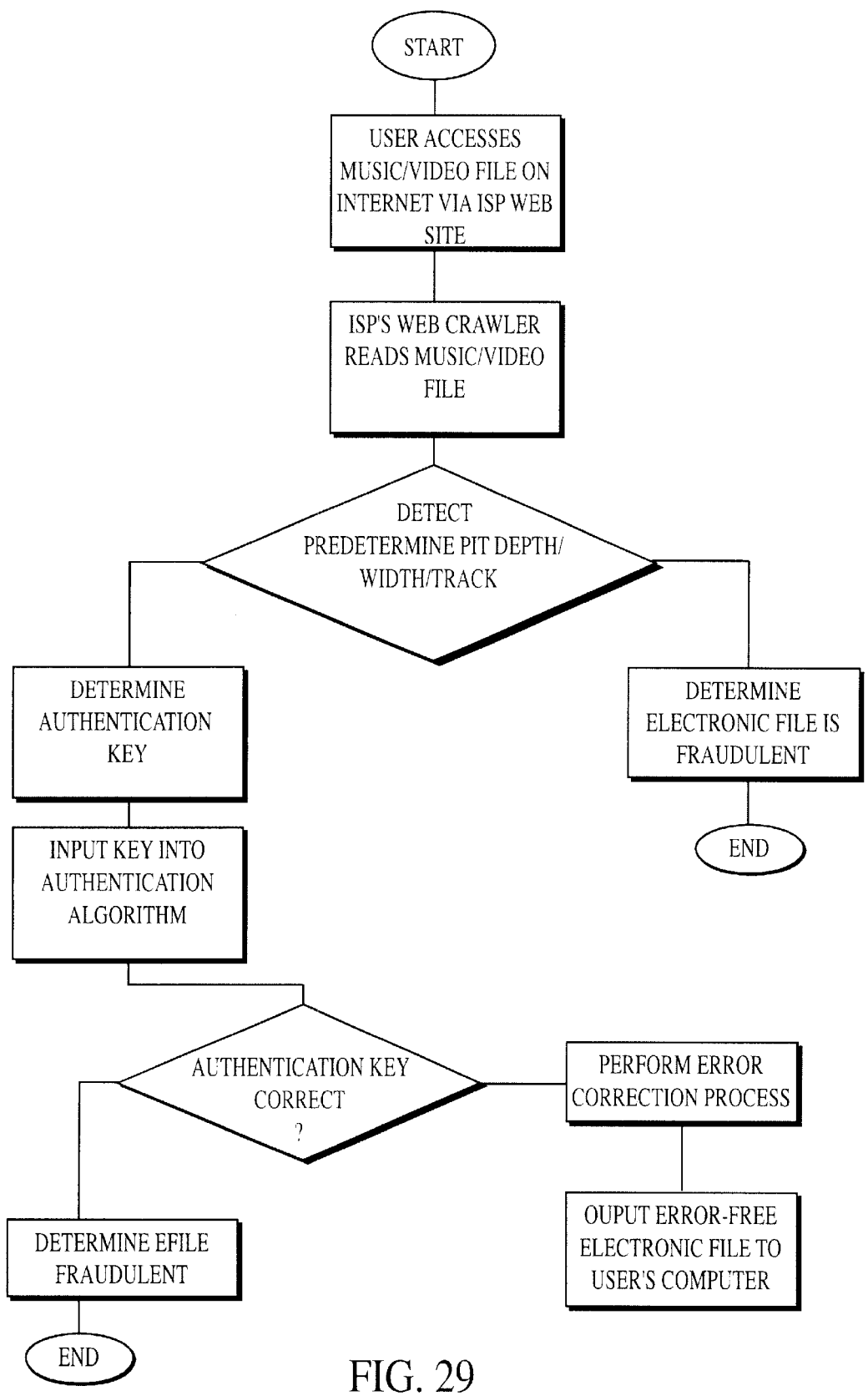
FIG. 29 shows a flow chart of the decision logic describing the authentication process of an electronic audio/video data file retrieved via the Internet for playing.

FIGS. 28–29 shows the authentication process as it applies to Internet-related playing and copying. For instance, FIG. 28 shows a block diagram of the process by which pit depth, pit width and/or pit track modulations are stored in an electronic file, and are used as an authentication key or keys for authenticating the existence of a non-pirated efile. The process begins with a data media, which may be a disc, a computer or network of computers, such as the Internet, capable of storing data.

In this embodiment, the data is an electronic video or audio data file ("efile") 210 into which pit depth, pit width and/or pit track modulations are reproduced. These modulations are mixed and edited with the original video or audio data and stored in the efile.

The resulting data ("efile data") 212 containing the modulations is transmitted into an authentication module 216 when efile 210 is requested by a user over the Internet.

Authentication module 216 is disposed, for example, at the ISP's web site 214, which uses the pit modulated data in efile data 212 as keys or components thereof, for authenticating whether efile 210 is a non-pirated file. Once efile 210 is authenticated, authentication module 216 transfers data 212 to a decoder web crawler 218, which intakes the data, manipulates it, performs error correction and outputs corrected data 219. The new corrected data 219 is free of pit modulated data and authentication keys, and contains the original (audio and/or video) data only.

The above description is one example of the architecture used to implement the present invention, and other architectures may also be used. For example, the ISP website and/or server need not physically house or contain the authentication or decoder modules, but one or both of these devices may be disposed remote to the ISP website and/or server.

FIG. 29 illustrates a flow chart of the decision logic describing the authentication process of an electronic audio/video data file retrieved via the Internet for playing. The process begins at Step 102 (S102) when a user accesses music and/or video file(s) on the Internet via an ISP's web site 214. The ISP's decoder web crawler 218 begins reading the efile 210, (Step 104), looking for pit depth, pit depth and/or pit track modulated data (Step 106). If no modulated data is found, efile 210 is determined to be fraudulent, (Step 108), and efile 210 is not transmitted to the user (Step 110). Thus, unauthorized access is prevented.

On the other hand, if it is found that efile 210 contains modulated data, the next Step 112 is to read those data and determine the authentication key(s), an operation performed by an authentication algorithm located within authentication module 216.

Once the authentication key(s) or components thereof is/are read into the authentication algorithm, (Step 114), it is then determined whether the authentication key(s) is/are correct (Step 116). The authentication algorithm at the ISP's web site 214 will have a component corresponding to the authentication key(s) in efile 210. If comparison of the component with the key(s) does not match, efile 210 is determined to be fraudulent (Step 118), and efile 210 is not transmitted to the user (Step 120).

If, on the other hand, it is determined that the component correctly or substantially matches the authentication key(s), error correction occurs, (Step 122), the modulated data is filtered, data is converted to sensible audio and/or video output data, and ultimately transmitted to the user (Step 124).

Figure 30:
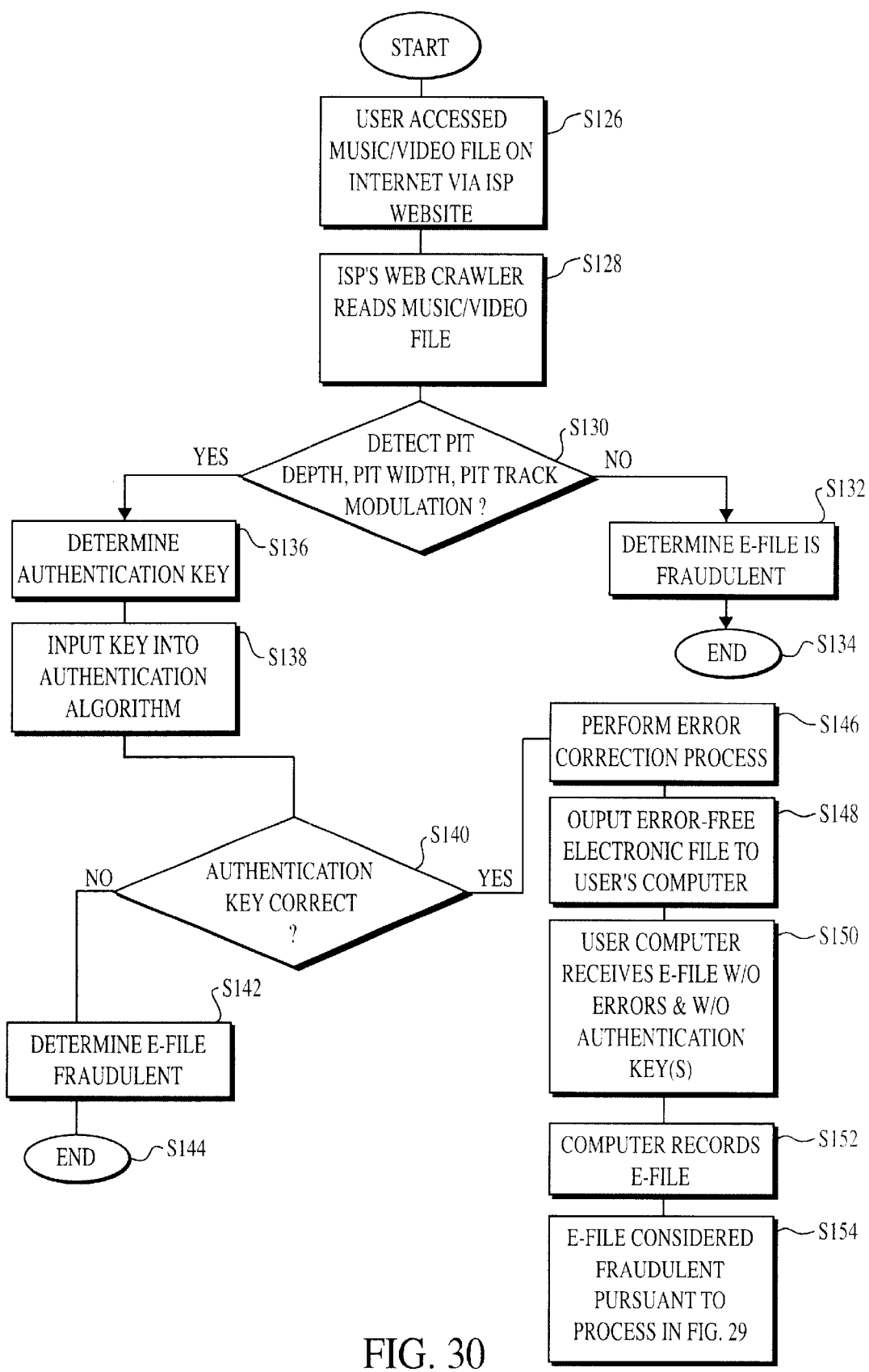
FIG. 30 shows a flow chart of the decision logic describing the authentication process of an electronic audio/video data file retrieved via the Internet for copying.

FIG. 30 illustrates a flow chart of the decision logic describing the authentication process of an electronic audio/video data file retrieved via the Internet for copying. The process begins at Step 126 (S126) when a user accesses music and/or file(s) on the Internet via an ISP's web site 214. The ISP's decoder web crawler 218 begins the efile 210 (Step 128) looking for pit depth, pit width and/or pit track modulated data (Step 130). If no modulations are found, efile 210 is determined to be fraudulent (Step 132), and efile 210 is not transmitted to the user (Step 134). Thus, unauthorized access is prevented.

On the other hand, if it is found that efile 210 contains modulated data, the next Step 136 is to read that data and determine the authentication key(s), an operation performed by an authentication algorithm located within authentication module 216.

Once the authentication key or keys are read into the authentication algorithm (Step 138), it is then determined whether each authentication key is correct (Step 140). The authentication algorithm at the ISP's web site 214 will have a component corresponding to the authentication key(s) in efile 210. If comparison of the component with the key(s) or components thereof does not match or substantially match, efile 210 is determined to be fraudulent (Step 142), and efile 210 is not transmitted to the user (Step 144).

If, on the other hand, it is determined that the component correctly matches the authentication key(s), error correction occurs (Step 146), errors are removed, modulated data is filtered, data is converted to sensible audio and/or video output data, and ultimately transmitted to the user (Step 148). The user's computer receives an efile 210 free of errors and authentication key(s) (Step 150), at which point a user may record the efile 120 (Step 152). This efile 210 is considered fraudulent for purposes of future Internet use (S154), pursuant to the process outlined in FIG. 29, because it does not contain the requisite pit depth, pit width and/or pit track modulated data for subsequent authentication.

Figure 31:
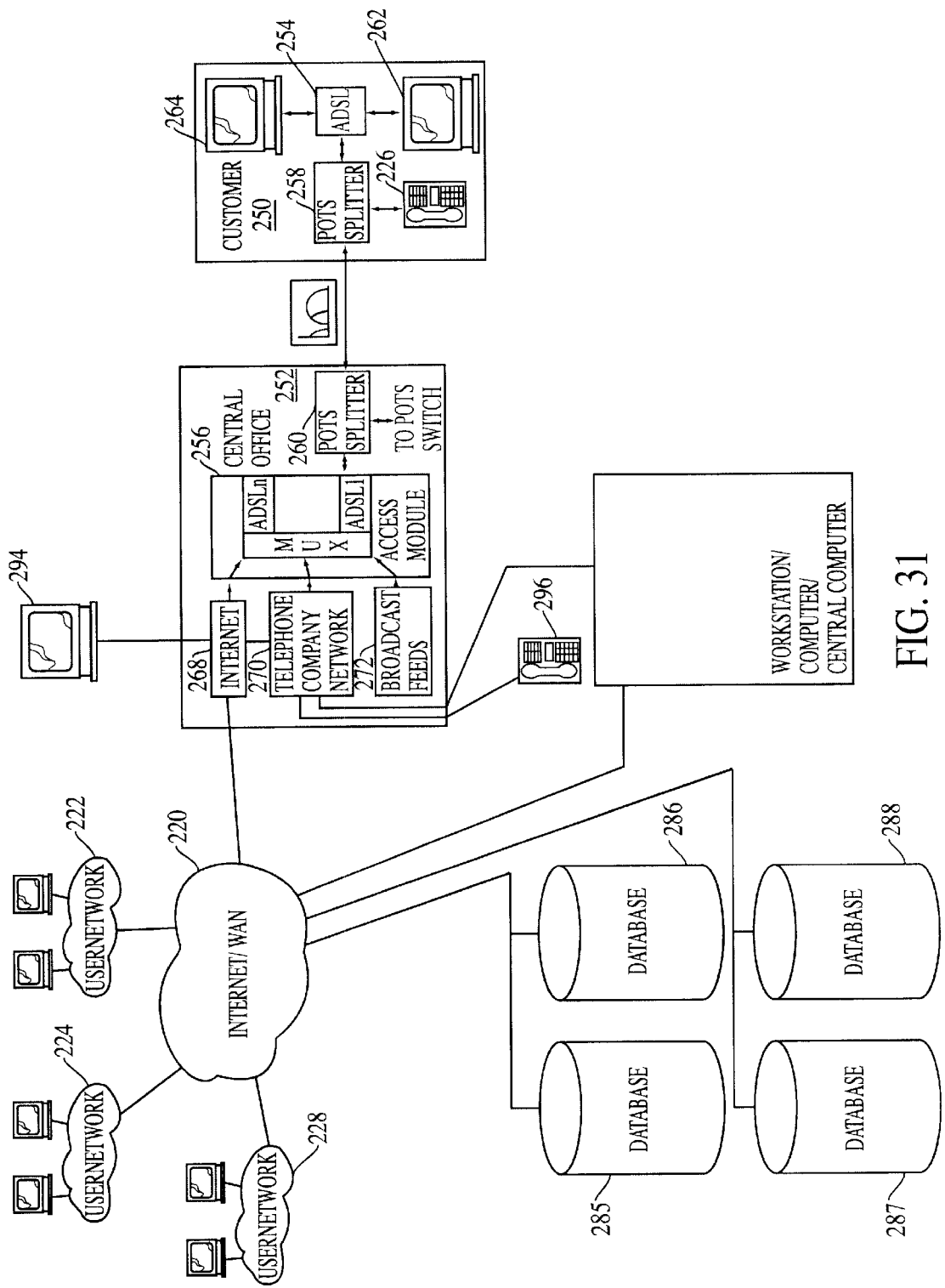
FIG. 31 is an illustration of the architecture of the combined Internet, POTS, and ADSL architecture for use in the present invention in accordance with another design or embodiment.

FIG. 31 is an illustration of the architecture of the combined Internet, POTS, and ADSL architecture for use in the present invention in accordance with another embodiment. In FIG. 31, to preserve POTS and to prevent a fault in the ADSL equipment 254, 256 from compromising analog voice traffic 226, 296 the voice part of the spectrum (the lowest 4 kHz) is optionally separated from the rest by a passive filter, called a POTS splitter 258, 260. The rest of the available bandwidth (from about 10 kHz to 1 MHZ) carries data at rates up to 6 bits per second for every hertz of bandwidth from data equipment 262, 264, 294. The ADSL equipment 256 then has access to a number of destinations including significantly the Internet 268, and other destinations 270, 272.

To exploit the higher frequencies, ADLS makes use of advanced modulation techniques, of which the best known is the discrete multitone technology (DST). As its name implies, ADSL transmits data asymmetrically at different rates upstream toward the central office 252 and downstream toward the subscriber 250.

Cable television providers are providing analogous Internet service to PC users over their TV cable systems by means of special cable modems. Such modems are capable of transmitting up to 30 Mb/s over hybrid fiber/coax systems, which use fiber to bring signals to a neighborhood and coax to distribute it to individual subscribers.

Cable modems come in many forms. Most create a downstream data stream out of one of the 6-MHZ television channels that occupy spectrum above 50 MHZ (and more likely 550 MHz) and carve an upstream channel out of the 5–50 MHZ band, which is currently unused. Using 64-state quadrature amplitude modulation (64 QAM), a downstream channel can realistically transmit about 30 Mb/s (the oft-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream.

The Internet architecture 220 and ADSL architecture 254, 256 may also be combined with, for example, user networks 222, 224, 228. As illustrated in this embodiment, users may access or use or participate in the administration, or management computer assisted program in computer 240 via various different access methods. In this embodiment, the various databases 285, 286, 287 and/or 288, which may be used to store content, data and the like, are accessible via access to and/or by computer system 240, and/or via Internet/local area network 220.

The above embodiments are only to be construed as examples of the various different types of computer systems that may be utilized in connection with the computer-assisted and/or -implement process of the present invention. Further, while the above description has focused on introducing pit depth, width and/or track modulated data into a specific media, such as a CD, the present invention may also be used to introduce such modulated data to a digital bit stream that is in the process of being transmitted from an originating area or device to a destination device.

That is, the authentication process of the present invention may be used to authenticate a data stream or collection of data, as opposed to, or in addition to, authenticating a specific media that has been used to play the data. In addition, various standard matching algorithms may be used to determine whether the generated authentication key(s) or components thereof match or substantially match for authentication purposes.

The many features and advantages of the invention are apparent from the detailed specification. Thus, it is intended by the appended claims to cover all such features and advantages of the invention that fall within the true spirit and scope of the invention.

Further, since numerous modifications and variations will readily occur to those skilled in the art, it is not desired to limit the invention to the exact construction illustrated and described. Accordingly, all suitable modifications and equivalents may be resorted to, falling within the scope of the invention.

What is claimed is:

1. A method for authenticating at least one of a media and data stored on said media, in order to prevent at least one of piracy, unauthorized access and unauthorized copying of the data stored on said media, wherein said media is modulated via at least one of pit depth, pit width and pit track comprising at least one authentication key or component thereof for authenticating whether at least one of said media and said data is authenticated, said method comprising the steps of:

(a) reading the data from said media;

(b) detecting the modulation of the at least one of said pit depth, pit width and pit track;

(c) deriving an embedded authentication key or component thereof responsive to said detecting step (b);

(d) comparing the embedded authentication key or component thereof to at least one authentication key or component thereof;

(e) authenticating at least one of said media and said data responsive to said comparing step (d); and (f) outputting said data as at least one of audio, video, audio data, video data and digital data substantially free of the modulation of the at least one of the pit depth, pit width and pit track.

2. A method according to claim 1, wherein said deriving step (c) derives the embedded authentication key or component thereof as a combination of on-off binary codes representing ones and zeros to represent a predetermined pattern.

3. A method according to claim 1, wherein said outputting step (f) further includes the step of converting said data into a stereo analog signal without transferring, in the data, the modulation of the at least one of the pit depth, pit width and pit track used to derive the embedded authentication key or component thereof.

4. A method according to claim 1, and further including the step of:

(g) physically altering the at least one of pit depth, pit width and pit track of the media on at least one of a per track basis and interval basis throughout said media such that said authentication step (e) is performed for at least one of each track to be played, throughout playback and throughout recording.

5. A method according to claim 1, wherein said authenticating step (e) further includes a step of authenticating using a different authentication key or component thereof for each disc track.

6. A method according to claim 1, said method comprises the step of authenticating the at least one of the data and the media via at least two different authentication keys, each of which successively must be authenticated before said data is finally output via said outputting step (f).

7. A method according to claim 1, wherein said method authenticates the at least one of the media and the data over a plurality of interconnected computer networks comprising at least one of a local network, global network and Internet.

8. A method according to claim 1, wherein said authenticating step (e) further includes a step of using at least three different sources for compiling long or compound authentication keys.

9. A method according to claim 1 wherein said deriving step (c) further comprises the step of at least one of decoding and decrypting-the embedded authentication key or component thereof.

10. A method according to claim 1 wherein said comparing step (d) further comprises the step of comparing a modulated signal derived from at least one of pit depth, pit width and pit track modulation, to a table of valid modulated signals derived from at least one of pit depth, pit width and pit track modulation.

11. In a method for authenticating at least one of a media and data stored on said media, in order to prevent at least one of piracy, unauthorized access and unauthorized copying of the data stored on said media, a data disc comprising media that is modulated via at least one of pit depth, pit width and pit track comprising at least one authentication key or component thereof for authenticating whether at least one of said media and said data is authenticated.

12. In a method for authenticating at least one of a media and data stored on said media, in order to prevent at least one of piracy, unauthorized access and unauthorized copying of the data stored on said media, wherein said media is modulated via at least one of pit depth, pit width and pit track comprising at least one authentication key or component thereof, for authenticating whether the at least one of said media and said data is authenticated, a data player comprising a data processor performing the steps of:

(a) reading the data from said media;

(b) detecting the modulation of the at least one of pit depth, pit width and pit track;

(c) deriving an embedded authentication key or component thereof responsive to said detecting step (b);

(d) comparing the embedded authentication key or component thereof to at least one authentication key or component thereof;

(e) authenticating at least one of said media and said data responsive to said comparing (d) step; and (f) outputting said data as at least one of audio, video, audio data, video data and digital data substantially free of the modulation of the at least one of the pit depth, pit width and pit track.

13. In a method for authenticating at least one of a media and data to be stored on said media, in order to prevent at least one of piracy, unauthorized access and unauthorized copying of the data stored on said media, a data message comprising modulation via at least one of pit depth, pit width and pit track comprising at least one authentication key or component thereof lo for authenticating whether said data message is authenticated, and wherein the modulation of the at least one of the pit depth, pit width and pit track cannot be readily altered, obscured nor removed from said data without simultaneously degrading or impairing a quality of an audible component of said data message, and wherein the data message is transmitted substantially free of the modulation of the at least one of the pit depth, pit width and pit track, thereby preventing a destination processor from reading and subsequently authenticating the data message.

14. A system for authenticating at least one of a media and data stored on said media, in order to prevent at least one of piracy, unauthorized access and unauthorized copying of the data stored on said media, wherein said media is modulated via at least one of pit depth, pit width and pit track comprising at least one authentication key or component thereof for authenticating whether at least one of said media and said data is authenticated, said system including a data player containing a data processor comprising:

(a) first detecting means for detecting all pit modulated data from a data stream;

(b) second detecting means for determining authentication key data that has been pit depth modulated based on a physical characteristic of a data disc;

(c) third detecting means for determining authentication key data that has been pit width modulated based on a physical characteristic of a data disc;

(d) fourth detecting means for determining authentication key data that has been pit track modulated based on a physical characteristic of a data disc;

wherein the first, second, third and fourth detecting means are interconnected via a focus server, tracking server, laser, lens and mirror, further comprising a portion of a disc reader housed in a data player device.

15. The data disc of claim 11, wherein the authentication key or component thereof is derived as a combination of on-off binary codes representing ones and zeros to represent a predetermined pattern.

16. The data disc of claim 11, wherein the media is modulated via at least one of pit depth, pit width and pit track on at least one of a per track basis and an interval basis throughout said media such that the data is authenticated for at least one of each track to be played, throughout playback and throughout recording.

17. The data disc of claim 11, wherein the at least one of said media and said data is authenticated using a different authentication key or component thereof for each disc track.

18. The data disc of claim 11, wherein the at least one of said media and said data is authenticated using at least two different authentication keys, each of which successively must be authenticated before said data is finally output.

19. The data disc of claim 11, wherein the at least one of said media and said data is authenticated over a plurality of interconnected computer networks comprising at least one of a local network, global network, and Internet.

20. The data disc of claim 11, wherein the at least one of said media and said data is authenticated using at least three different sources for compiling long or compound authentication keys.

21. The data disc of claim 11, wherein said authentication key or component thereof is at least one of decoded and decrypted.

22. The data player of claim 12, wherein said deriving step (c) derives the embedded authentication key or component thereof as a combination of on-off binary codes representing ones and zeros to represent a predetermined pattern.

23. The data player of claim 12, wherein said outputting step (f) further includes the step of converting said data into a stereo analog signal without transferring, in the data, the modulation of the at least one of the pit depth, pit width and pit track used to derive the embedded authentication key or component thereof.

24. The data player of claim 12, wherein the data processor further performs the step of:

(g) physically altering the at least one of pit depth, pit width and pit track of the media on at least one of a per track basis and an interval basis throughout said media such that said authentication step (e) is performed for at least one of each track to be played, throughout playback and throughout recording.

25. The data player of claim 12, wherein said authentication step (e) further includes a step of authenticating using a different authentication key or component thereof for each disc track.

26. The data player of claim 12, wherein the data processor further performs the step of authenticating the at least one of the data and the media via at least two different authentication keys, each of which successively must be authenticated before said data is finally output via said outputting step (f).

27. The data player of claim 12, wherein the data processor further performs the step of authenticating the at least one of the data and the media over a plurality of interconnected computer networks comprising at least one of a local network, global network and Internet.

28. The data player of claim 12, wherein said authenticating step (e) further includes a step of using at least three different sources for compiling long or compound authentication keys.

29. The data player of claim 12, wherein said deriving step (c) further comprises the step of at least one of decoding and decrypting the embedded authentication key or component thereof.

30. The data player of claim 12, wherein said comparing step (d) further comprises the step of comparing a modulated signal derived from at least one of pit depth, pit width and pit track modulation, to a table of valid modulated signals derived from at least one of pit depth, pit width and pit track modulation.

31. The data message of claim 13, wherein the authentication key or component thereof is derived as a combination of on-off binary codes representing ones and zeros to represent a predetermined pattern.

32. The data message of claim 13, wherein modulation via at least one of pit depth, pit width and pit track is on at least one of a per track basis and an interval basis throughout said media such that the data is authenticated for at least one of each track to be played, throughout playback and throughout recording.

33. The data message of claim 13, wherein said data message is authenticated using a different authentication key or component thereof for each disc track.

34. The data message of claim 13, wherein said data message is authenticated using at least two different authentication keys, each of which successively must be authenticated before said data is finally output.

35. The data message of claim 13, wherein said data message is authenticated over a plurality of interconnected computer networks comprising at least one of a local network, global network, and Internet.

36. The data message of claim 13, wherein said data message is authenticated using at least three different sources for compiling long or compound authentication keys.

37. The data message of claim 13, wherein said authentication key or component thereof is at least one of decoded and decrypted.

38. The system of claim 14, wherein the authentication key or component thereof is derived as a combination of on-off binary codes representing ones and zeros to represent a predetermined pattern.

39. The system of claim 14, wherein the media is modulated via at least one of pit depth, pit width and pit track on at least one of a per track basis and an interval basis throughout said media such that the data is authenticated for at least one of each track to be played, throughout playback and throughout recording.

40. The system of claim 14, wherein the at least one of said media and said data is authenticated using a different authentication key or component thereof for each disc track.

41. The system of claim 14, wherein the at least one of said media and said data is authenticated using at least two different authentication keys, each of which successively must be authenticated before said data is finally output.

42. The system of claim 14, wherein the at least one of said media and said data is authenticated over a plurality of interconnected computer networks comprising at least one of a local network, global network, and Internet.

43. The system of claim 14, wherein the at least one of said media and said data is authenticated using at least three different sources for compiling long or compound authentication keys.

44. The system of claim 14, wherein said authentication key or component thereof is at least one of decoded and decrypted.

* * * * *